(12) United States Patent
Kim et al.

(10) Patent No.: US 10,298,360 B2
(45) Date of Patent: May 21, 2019

(54) METHOD AND DEVICE FOR DETERMINING TOGGLE SEQUENCE AND ERROR PATTERN BASED ON SOFT DECISION

(71) Applicant: Yonsei University Wonju Industry-Academic Cooperation Foundation, Wonju-si, Gangwon-do (KR)

(72) Inventors: Jae Kwon Kim, Wonju-si (KR); Ju Hee Yun, Wonju-si (KR); Nu Li Byul Kim, Gunpo-si (KR)

(73) Assignee: YONSEI UNIVERSITY WONJU INDUSTRY-ACADEMIC COOPERATION FOUNDATION, Wonju-si, Gangwon-do (KR)

( * ) Notice: Subject to any disclaimer, the term of this patent is extended or adjusted under 35 U.S.C. 154(b) by 425 days.

(21) Appl. No.: 14/765,288

(22) PCT Filed: Feb. 17, 2015

(86) PCT No.: PCT/KR2015/001661
§ 371 (c)(1),
(2) Date: Jul. 31, 2015

(87) PCT Pub. No.: WO2015/122751
PCT Pub. Date: Aug. 20, 2015

(65) Prior Publication Data
US 2016/0269148 A1   Sep. 15, 2016

(30) Foreign Application Priority Data

Feb. 17, 2014  (KR) .................. 10-2014-0018106

(51) Int. Cl.
*H04L 1/00* (2006.01)
*H04L 1/18* (2006.01)

(52) U.S. Cl.
CPC .......... *H04L 1/0045* (2013.01); *H04L 1/0047* (2013.01); *H04L 1/0061* (2013.01); *H04L 1/1864* (2013.01); *H04L 1/1867* (2013.01)

(58) Field of Classification Search
CPC ... H04L 1/0057; H04L 1/0061; H04L 1/0041; H04L 1/0083; H04L 1/0072;
(Continued)

(56) References Cited

U.S. PATENT DOCUMENTS 6,044,483 A * 3/2000 Chen .................. G06F 11/1044
714/48
6,606,726 B1 * 8/2003 Wilhelmsson ......... G11B 20/18
714/758

(Continued)

FOREIGN PATENT DOCUMENTS

WO   WO 2006122291 A2 * 11/2006 ............ H03M 13/45

*Primary Examiner* — Albert Decady
*Assistant Examiner* — Enam Ahmed
(74) *Attorney, Agent, or Firm* — Novick, Kim & Lee, PLLC; Jae Youn Kim

(57) ABSTRACT

Provided is a method of determining a toggle sequence for error detection based on a soft decision value and a method and apparatus for determining an error pattern, and more particularly, to a method of determining an optimum toggle sequence and error pattern based on a soft decision value in order to allow for faster error (pattern) detection and correction. It is an object of the invention to implement low redundancy, less delay, and a receive-side error correction capability by combining advantages of the conventional ARQ scheme and the conventional FEC scheme using a soft decision reliability. For this purpose, according to a first embodiment of the present invention, in order to optimize the toggle sequence speed, there is provided a method of
(Continued)

determining a toggle sequence such that bits are toggled sequentially in the order of a smaller sum of soft decision reliabilities to be toggled.

11 Claims, 19 Drawing Sheets

(58) Field of Classification Search
CPC ... H04L 1/0045; H04L 1/1867; H04L 1/1864; H04L 1/0047
USPC .......................................................... 714/776
See application file for complete search history.

(56) References Cited

U.S. PATENT DOCUMENTS

| | | | |
|---|---|---|---|
| 6,643,819 B1 | 11/2003 | Weng | |
| 7,024,599 B2* | 4/2006 | Castagnozzi | H04L 25/03012 714/709 |
| 8,127,209 B1* | 2/2012 | Zhang | H03M 13/1128 714/780 |
| 8,381,084 B2* | 2/2013 | Furbeck | H04L 1/0045 340/436 |
| 8,572,442 B2* | 10/2013 | Oyama | H03M 13/136 714/708 |
| 8,681,817 B2* | 3/2014 | Anderson | H04L 1/0061 370/328 |
| 8,873,365 B2* | 10/2014 | Walton | H04B 7/0669 370/208 |
| 2004/0010742 A1* | 1/2004 | Williamson | H03M 13/1515 714/746 |
| 2008/0148129 A1* | 6/2008 | Moon | H03M 13/15 714/758 |
| 2010/0100793 A1* | 4/2010 | Limberg | H03M 13/258 714/756 |
| 2010/0199149 A1* | 8/2010 | Weingarten | G06F 11/1068 714/773 |
| 2010/0251038 A1* | 9/2010 | Oyama | H03M 13/136 714/704 |
| 2012/0005560 A1 | 1/2012 | Steiner et al. | |
| 2012/0287973 A1 | 11/2012 | Shen et al. | |
| 2013/0104005 A1 | 4/2013 | Weingarten et al. | |
| 2014/0040704 A1 | 2/2014 | Wu et al. | |
| 2014/0053044 A1* | 2/2014 | Nakasendo | H03M 13/45 714/776 |
| 2014/0075258 A1* | 3/2014 | Miller | H04L 1/0047 714/746 |
| 2014/0153625 A1* | 6/2014 | Vojcic | H04L 1/005 375/224 |
| 2014/0181623 A1* | 6/2014 | Jung | H04L 1/007 714/776 |
| 2015/0006992 A1* | 1/2015 | Xiong | H03M 13/2957 714/755 |
| 2016/0126979 A1* | 5/2016 | Murakami | H03M 13/036 714/776 |
| 2016/0352463 A1* | 12/2016 | Vojcic | H04L 1/005 |

* cited by examiner

0: $[\mathbf{SEQ}^{new}]$=Toggle_Seq_Gen$\left(\left[\tilde{b}_{(1)} \tilde{b}_{(2)} \cdots \tilde{b}_{(N_{b\_max})}\right], N_{b\_max}, N_{CRC\_max}\right)$ 1: Input: $\left[\tilde{b}_{(1)} \tilde{b}_{(2)} \cdots \tilde{b}_{(N_{b\_max})}\right]$ ; $N_{b\_max}$   SMALLEST SOFT-DECISION VALUE 2:   $N_{b\_max}$ ;   MAXIMUM NUMBER OF BITS THAT CAN BE TOGGLED 3:   $N_{CRC\_max}$ ;   MAXIMUM TOGGLE SEQUENCE NUMBER 4: Output: $\mathbf{SEQ}^{new}$ ; $N_{CRC\_max}$   TOGGLE SEQUENCE 5: $\mathbf{SEQ} \leftarrow \begin{bmatrix} \overbrace{0 \cdots 000}^{N_{b\_max}} \\ 0 \cdots 001 \\ 0 \cdots 010 \\ 0 \cdots 011 \end{bmatrix}$ 6: CRC_ptr $\leftarrow$ 3

7: For $s = 3 : N_{b\_max}$

8:    $\mathbf{SEQ}^{new} \leftarrow \mathbf{SEQ} + 2^{s-1}$

9:    $l_{pos} \leftarrow \text{find}(\mathbf{SEQ}^{new} = 2^{s-1} + \sum_{j=0}^{s-3} 2^j)$ 10:   $\mathbf{SEQ} \leftarrow \text{sort} \begin{Bmatrix} \mathbf{SEQ}(1:\text{CRC\_ptr}) \\ \begin{pmatrix} \mathbf{SEQ}(\text{CRC\_ptr}+1:\text{end}) \\ \mathbf{SEQ}^{new}(1:l_{pos}-1) \end{pmatrix} \\ \mathbf{SEQ}^{new}(l_{pos}:\text{end}) \end{Bmatrix}$ 11:   CRC_ptr $\leftarrow \text{find}(\mathbf{SEQ} = 2^{s-1})$ 12:   If CRC_ptr $\geq N_{CRC\_max}$, Return $\mathbf{SEQ}(1:N_{CRC\_max})$ EndIf 13: EndFor 14: If CRC_ptr $< N_{CRC\_max}$ Return $\mathbf{SEQ}(1:N_{CRC\_max})$ EndIf

FIG. 6

$\mathbf{b} = [0\ 1\ 1\ 1\ 1\ 1\ 0\ 1\ 0\ 0\ 1\ 0\ 0\ 0\ 1\ 0\ 1\ 0\ 0\ 0]^T$ $\mathbf{c} = [0\ 1\ 1\ 1\ 1\ 1\ 0\ 1\ 0\ 0\ 1\ 0\ 0\ 0\ 1\ 0\ 1\ 0\ 0\ 0\ 0\ 1\ 0\ 1\ 1\ 1\ 1\ 1\ 1\ 1\ 1]^T; \quad g(X) = X^{12} + X^{11} + X^3 + X^2 + X + 1$ $\tilde{\mathbf{c}} = [-3.67,\ 2.16,\ 3.75,\ 3.88,\ 3.96,\ 3.93,\ -1.81,\ 3.56,\ -0.02,\ -2.23,\ 4.13,\ -5.04,\ 0.40,\ -5.55,\ 5.39,\ -5.32,$
$\quad 4.84,\ -2.24,\ -4.35,\ -2.58,\ -1.23,\ 0.35,\ 2.42,\ -6.02,\ 3.51,\ 7.86,\ 2.66,\ -0.47,\ 2.10,\ 2.57,\ 3.25,\ 9.18]^T$ $P_{UR} = \{9, 22, 13, 28, 21\}$ $\quad\quad\quad\quad\quad\quad\quad\downarrow\quad\quad\downarrow\quad\quad\quad\downarrow\downarrow\quad\quad\downarrow$ $\hat{\mathbf{c}} = [0\ 1\ 1\ 1\ 1\ 1\ 0\ 1\ 0\ 0\ 1\ 0\ 1\ 0\ 1\ 0\ 1\ 0\ 0\ 0\ 0\ 1\ 1\ 0\ 1\ 1\ 1\ 0\ 1\ 1\ 1\ 1]^T$ $\mathbf{s} = [0\ 0\ 0\ 0\ 0\ 1\ 0\ 0\ 0\ 1\ 1\ 0]^T$ b : DATA BITS OF TRANSMIT SIGNAL
c : DATA BITS OF SIGNAL SUBJECTED TO CRC ENCODING IN TRANSMIT SIDE
$\tilde{\mathbf{c}}$ : RELIABILITY OF EACH SOFT-DECISION BITSTREAM $P_{UR}$ : BIT POSITIONS OF $N_{b,max}$ BITS
$\hat{\mathbf{c}}$ : HARD-DECISION DATA BITS

FIG. 17

$$\bar{H} = \begin{bmatrix} \mathbf{s}_9 & \mathbf{s}_{22} & \mathbf{s}_{13} & \mathbf{s}_{28} & \mathbf{s}_{21} \end{bmatrix} = \begin{bmatrix} 0 & 0 & 1 & 1 & 1 \\ 0 & 1 & 1 & 0 & 0 \\ 0 & 0 & 1 & 1 & 1 \\ 0 & 1 & 1 & 0 & 0 \\ 0 & 0 & 0 & 0 & 0 \\ 0 & 0 & 0 & 1 & 0 \\ 0 & 0 & 0 & 0 & 0 \\ 0 & 0 & 0 & 0 & 0 \\ 1 & 0 & 0 & 0 & 0 \\ 0 & 0 & 0 & 1 & 1 \\ 0 & 1 & 0 & 0 & 0 \\ 0 & 0 & 1 & 1 & 0 \end{bmatrix}.$$

$$\text{ptr}_4 = 7 \qquad \text{ptr}_5 > N_{max} \Rightarrow \mathcal{E}_5 = \mathcal{E}_4$$

$$\hat{c} = [0\ 1\ 1\ 1\ 1\ 1\ 0\ 1\ 0\ 0\ 1\ 0\ 1\ 0\ 1\ 0\ 1\ 0\ 0\ 0\ 1\ 1\ 0\ 1\ 1\ 1\ 0\ 1\ 1\ 1\ 1]^T$$

FIG. 26

METHOD AND DEVICE FOR DETERMINING TOGGLE SEQUENCE AND ERROR PATTERN BASED ON SOFT DECISION

CROSS REFERENCES TO RELATED APPLICATIONS

The present invention claims priority to Korean Patent Application No. 2014-0018106, filed in the Korean Patent Office on Feb. 17, 2014, the entire contents of which are incorporated herein by reference.

TECHNICAL FIELD

The present invention relates to a device capable of detecting and correcting an error in a receive signal in a receive side based on a soft decision value, and more particularly, to a method of determining an optimum toggle sequence based on a soft decision value in order to allow for faster error detection and correction.

In addition, the present invention relates to a method of determining an error pattern by sequentially sorting error patterns of a receive signal in a receive side based on a soft decision value on a lower reliability basis and comparing a syndrome of the error pattern and a syndrome of the receive signal.

BACKGROUND ART

There is known a forward error correction (FEC) scheme in which each packet has a relatively high redundancy for an error correction capability in a receive side. However, compared to an automatic repeat request (ARQ) scheme, error correction can be performed in the receive side, and there is no delay generated by a re-transmission request, so that the FEC scheme is suitable for a real-time data transmission system. Such an FEC scheme includes various techniques such as block coding, convolutional coding, turbo code (TC), and low density parity check (LPDC). FIG. 11 illustrates the FEC scheme having a 3/4 coding rate. It is recognized that 300 bits are redundant for each transmitted data of 900 bits, so that data are transmitted at a relatively high redundancy of approximately 33%.

In the case of the ARQ scheme such as a cyclic redundancy check (CRC), the redundancy of bits for detecting an error in a transmit signal is advantageously low. However, in the ARQ scheme, the error correction capability is not provided in the receive side, so that re-transmission is requested in the transmit side in the event of an error (no acknowledgement (NACK)). Therefore, compared to the FEC scheme having the error correction capability, the ARQ scheme is not suitable for a real-time service. FIG. 12 illustrates an exemplary ARQ scheme in which 31 bits for the CRC are transmitted, and re-transmission is requested in the event of "NACK." Since redundant data of 31 bits are transmitted when a total of 1169 bits are transmitted, the data redundancy is low at approximately 3%.

Therefore, there are demands for development of an error detection and correction technology having both an error correction capability as in the FEC scheme and a low redundancy capability as in the ARQ scheme so as to implement less delay.

Meanwhile, a soft decision value represents a reliability as well as a bit value of "0" or "1" unlike a hard decision value. Assuming additive white Gaussian noise (AWGN), a receive signal $y_i$ (where $i=1, 2, \ldots$) can be expressed as follows:

$$y_i = x_i + z_i, \quad i=1,2\ldots, \qquad \text{[Equation 1]}$$

where "$x_i$" denotes a transmit signal (where $i=1, 2 \ldots$), and "$z_i$" denotes a noise (where $i=1, 2, \ldots$) generated in the event of (i)th symbol transmission.

A soft decision value or a log likelihood ratio (LLR) can be obtained based on the aforementioned receive signal as follows:

$$LLR(b_{k,i}) = |y_i - x^{opt}_{i,k,-}|^2 - |y_i - x^{opt}_{i,k,+}|^2 \qquad \text{[Equation 2]}$$

where "$b_{k,i}$" denotes the (k)th bit of the (i)th symbol ("k" is set to 1, 2, 3, and 4 in the case of 16-QAM), "$x^{opt}_{i,k,-}$" denotes a point closest to "$y_i$" out of constellation points having the (k)th bit set to "0," and "$x^{opt}_{i,k,+}$" denotes a point closest to "$y_i$" out of constellation points having the (k)th bit set to "1."

Assuming 16-QAM as illustrated in FIG. 13, the soft decision value of Equation 2 can be obtained as follows:

$$LLR(b_{1,i}) = \begin{cases} (y_{I,i}-(3))^2 - (y_{I,i}-(-1))^2 = -8y_{I,i}+8, & 2 < y_{I,i} \\ (y_{I,i}-(1))^2 - (y_{I,i}-(-1))^2 = -4y_{I,i}, & 0 < y_{I,i} < 2 \\ (y_{I,i}-1)^2 - (y_{I,i}-(-1))^2 = -4y_{I,i}, & -2 < y_{I,i} < 0 \\ (y_{I,i}-1)^2 - (y_{I,i}-(-3))^2 = -8y_{I,i}-8, & y_{I,i} < -2 \end{cases} \quad \text{[Equation 3]}$$

$$LLR(b_{2,i}) = \begin{cases} (y_{I,i}-3)^2 - (y_{I,i}-1)^2 = -4y_{I,i}+8, & 2 < y_{I,i} \\ (y_{I,i}-3)^2 - (y_{I,i}-1)^2 = -4y_{I,i}+8, & 0 < y_{I,i} < 2 \\ (y_{I,i}-(-3))^2 - (y_{I,i}-(-1))^2 = 4y_{I,i}+8, & -2 < y_{I,i} < 0 \\ (y_{I,i}-(-3))^2 - (y_{I,i}-(-1))^2 = 4y_{I,i}+8, & y_{I,i} < -2 \end{cases}$$

$$LLR(b_{3,i}) = \begin{cases} (y_{R,i}-(-1))^2 - (y_{R,i}-(3))^2 = 8y_{R,i}-8, & 2 < y_{R,i} \\ (y_{R,i}-(-1))^2 - (y_{R,i}-(1))^2 = 4y_{R,i}, & 0 < y_{R,i} < 2 \\ (y_{R,i}-(-1))^2 - (y_{R,i}-1)^2 = 4y_{R,i}, & -2 < y_{R,i} < 0 \\ (y_{R,i}-(-3))^2 - (y_{R,i}-1)^2 = 8y_{R,i}+8, & y_{R,i} < -2 \end{cases}$$

-continued $$LLR(b_{4,i}) = \begin{cases} (y_{R,i} - 3)^2 - (y_{R,i} - 1)^2 = -4y_{R,i} + 8, & 2 < y_{R,i} \\ (y_{R,i} - 3)^2 - (y_{R,i} - 1)^2 = -4y_{R,i} + 8, & 0 < y_{R,i} < 2 \\ (y_{R,i} - (-3))^2 - (y_{R,i} - (-1))^2 = 4y_{R,i} + 8, & -2 < y_{R,i} < 0 \\ (y_{R,i} - (-3))^2 - (y_{R,i} - (-1))^2 = 4y_{R,i} + 8, & y_{R,i} < -2 \end{cases}$$

SUMMARY OF INVENTION

It is an object of the present invention to implement a low redundancy as an advantage of the conventional ARQ scheme and less delay and a receive-side error correction capability as advantages of the conventional FEC scheme by combining advantages of the ARQ scheme and the FEC scheme using a soft decision value.

In addition, it is an object of the present invention to implement improved performance simply by applying the error detection and correction scheme according to the present invention to the receive side without necessity of exchanging or modifying existing transmit-side equipment.

Furthermore, it is an object of the present invention to implement an error detection and correction capability with a simple structure without occupying large space within a circuit.

Moreover, it is an object of the present invention to provide a method of increasing an error detection and correction rate based on a soft decision value.

According to an aspect of the present invention, there is provided a receive-side error detection and correction device including: a soft decision bit stream generation unit that generates a soft decision bit stream having a reliability based on a receive signal received from a transmit side; a hard decision bit stream generation unit; and a toggling unit that sequentially toggles the hard decision bit on a lower reliability basis of the soft decision bit stream.

According to the present invention, the receive signal may have an error detection bit (CRC bit), and the error detection and correction device may include an error check unit that checks an error in the toggled hard decision bit stream.

In addition, in order to optimize the toggle sequence speed, according to another aspect of the present invention, there is provided a method of determining an optimum toggle sequence on a reliability basis of the soft decision bit stream for the receive signal, the method including: a process of setting a fundamental toggle sequence group; and an optimum toggle sequence determining process for determining a toggle sequence such that bits are toggled sequentially on a smaller sum basis of the soft decision reliabilities to be toggled out of the fundamental toggle sequence group.

According to still another aspect of the present invention, there is provided a method of determining an error pattern by comparing syndromes on a reliability basis of the received signal, the method including a process of, if an interrupt value is smaller than the number of error patterns of a first error pattern group $E_{Nb}$, determining a second unsorted error pattern group $E_{Nb+1}'$ by substituting the ($N_b$+1)th bit with "1" for error patterns of the first error pattern group $E_{Nb}$ until the interrupt value.

According to an embodiment of the present invention, it is possible to implement an optimum communication environment having both less delay and low redundancy. Furthermore, the receive-side error correction capability, that was difficult in the conventional CRC or ARQ scheme, can be implemented with low redundancy.

According to another embodiment of the present invention, there is no need to exchange or modify existing transmit-side equipment. Therefore, it is possible to implement an optimum communication environment while the existing error detection method (such as CRC) widely used in the art is directly applied. Accordingly, it is possible to minimize cost for exchanging equipment.

According to still another embodiment of the present invention, error detection and correction can be made under an in-chip communication environment using a circuit structure simpler than that of a conventional complicated error correction circuit used to improve a semiconductor product yield. Therefore, it is possible to miniaturize a circuit structure for error detection and correction and highly integrate circuits on the same semiconductor chip size.

According to further another embodiment of the present invention, using an error pattern sorting method using a mergesort algorithm, it is possible to remarkably increase an error pattern sorting speed on a reliability basis within a range of the interrupt value and the maximum error pattern correction number set by a user.

According to still further another embodiment of the present invention, it is possible to improve an error correction speed by allowing for error correction without repeatedly performing the CRC for error detection and correction.

BRIEF DESCRIPTION OF DRAWINGS

The foregoing and additional features and characteristics of this disclosure will become more apparent from the following detailed description considered with reference to the accompanying drawings, wherein:

FIG. 6 illustrates an algorithm obtained by generalizing a process of determining an optimum toggle sequence according to the first embodiment of the present invention;

FIG. 17 illustrates an exemplary signal used to describe the second embodiment of the present invention;

FIG. 18 illustrates a selection syndrome matrix for five bits on a lower reliability basis out of the syndrome matrix obtained from a result of the CRC for the exemplary signal of FIG. 17;

FIG. 19 illustrates a fundamental error pattern group according to the second embodiment of the present invention;

FIG. 20 illustrates a first error pattern group and a second unsorted error pattern group in the case of "$N_b=2$" and a first error pattern group in the case of "$N_b=3$" according to the second embodiment of the present invention;

FIG. 21 illustrates the first error pattern group and the second unsorted error pattern group in the case of "$N_b=3$" according to the second embodiment of the present invention;

FIG. 22 illustrates the first error pattern group and the second unsorted error pattern group in the case of "$N_b=4$" according to the second embodiment of the present invention;

FIG. 23 illustrates corresponding syndromes as well as the first error pattern group and the second unsorted error pattern group in the case of "$N_b=3$" of FIG. 21 according to the second embodiment of the present invention;

FIG. 24 illustrates the first error pattern group and the second unsorted error pattern group in the case of "$N_b=3$" and the first error pattern group in the case of "$N_b=4$" according to the second embodiment of the present invention;

FIG. 25 illustrates the first error pattern group in the case of "$N_b=5$" according to the second embodiment of the present invention;

FIG. 26 illustrates a process of correcting an error by selectively toggling an error bit based on the determined error pattern according to the second embodiment of the present invention.

DESCRIPTION OF EMBODIMENTS

A description will now be made for embodiments of the present invention with reference to the accompanying drawings. The present invention includes a first embodiment for sorting a toggle sequence on a reliability basis and a second embodiment for determining an error pattern out of error patterns and syndromes thereof. Basically, both embodiments are characterized in that a bit error is corrected based on a soft decision reliability. Therefore, the first and second embodiments are similar in many parts, and those similar parts will not be repeatedly described herein.

First Embodiment: Method of Sorting Toggle Sequence on Reliability Basis

Figure 1:
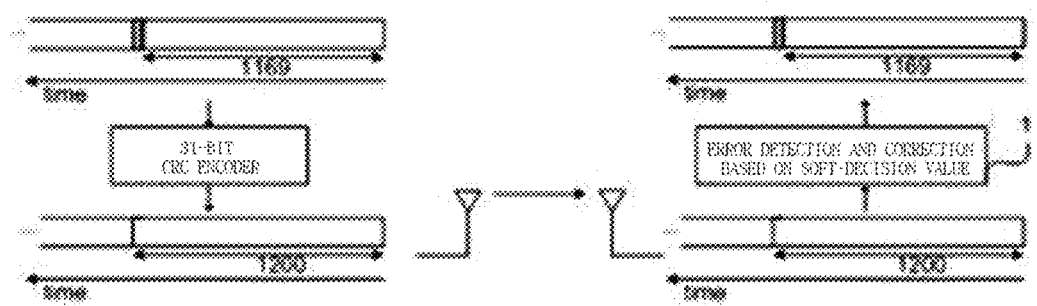
FIG. 1 illustrates a concept of an error detection and correction device according to the present invention.
Figure 11:
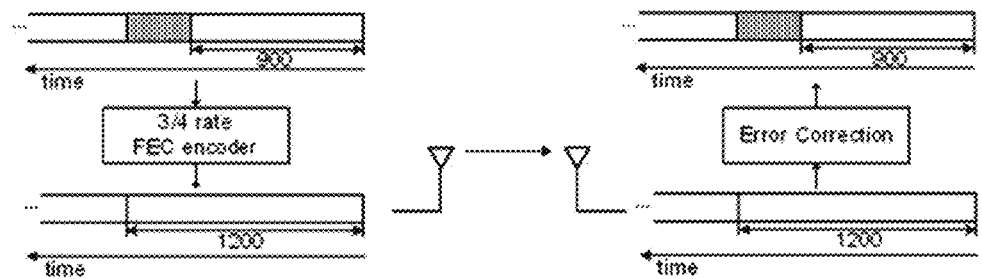
FIG. 11 illustrates a conventional FEC scheme having a 3/4 coding rate.
Figure 12:
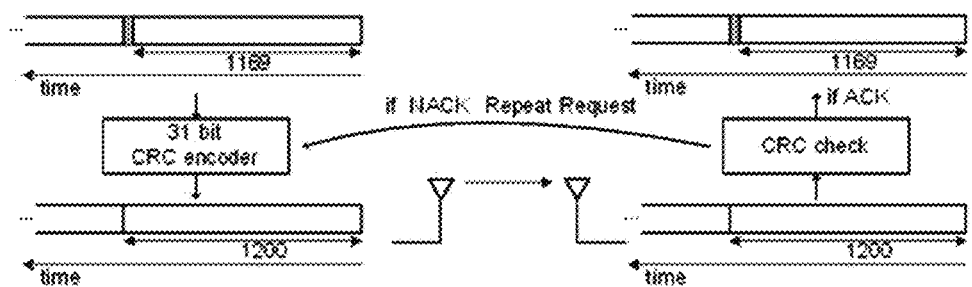
FIG. 12 illustrates a conventional ARQ scheme in which retransmission is requested in the case of "NACK" when 31 bits are transmitted for CRC.
Figure 13:
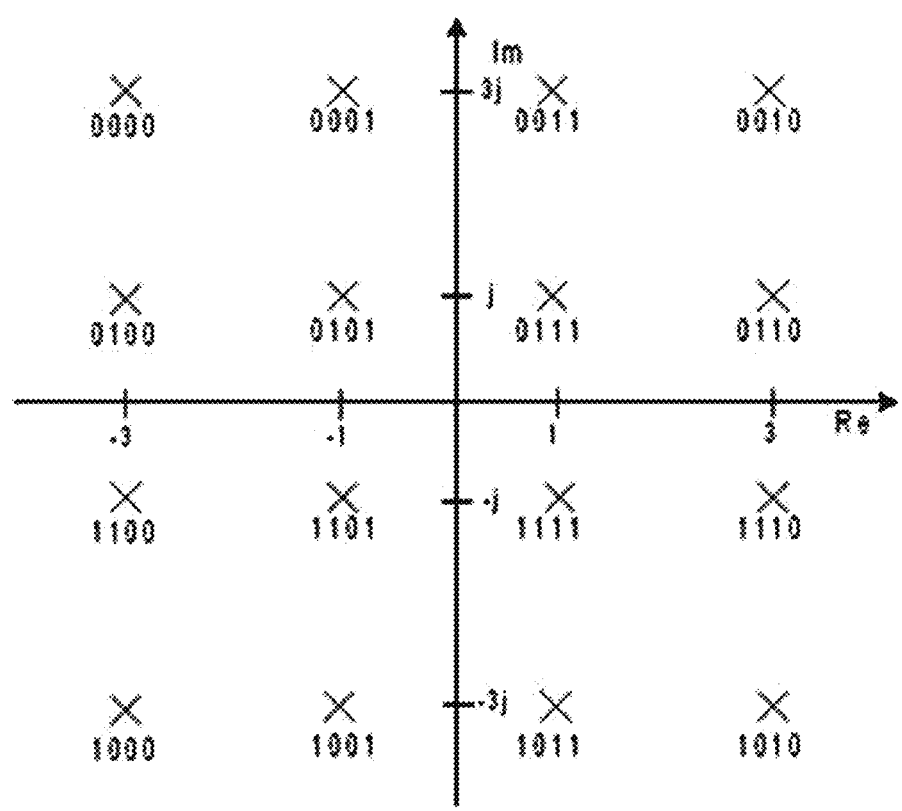
FIG. 13 is an exemplary constellation diagram for a conventional 16-QAM scheme.

FIG. 1 illustrates a concept of an error detection and correction device according to the present invention. Compared to the FEC scheme described above (FIG. 11), the error detection and correction device according to the present invention has an error correction capability in the receive side even with very low redundancy (as low as the CRC). Therefore, the error detection and correction device according to the present invention can be implemented just by causing the receive side to insert few error detection bits in a way similar to that of the conventional ARQ scheme (FIG. 12).

Figure 2:
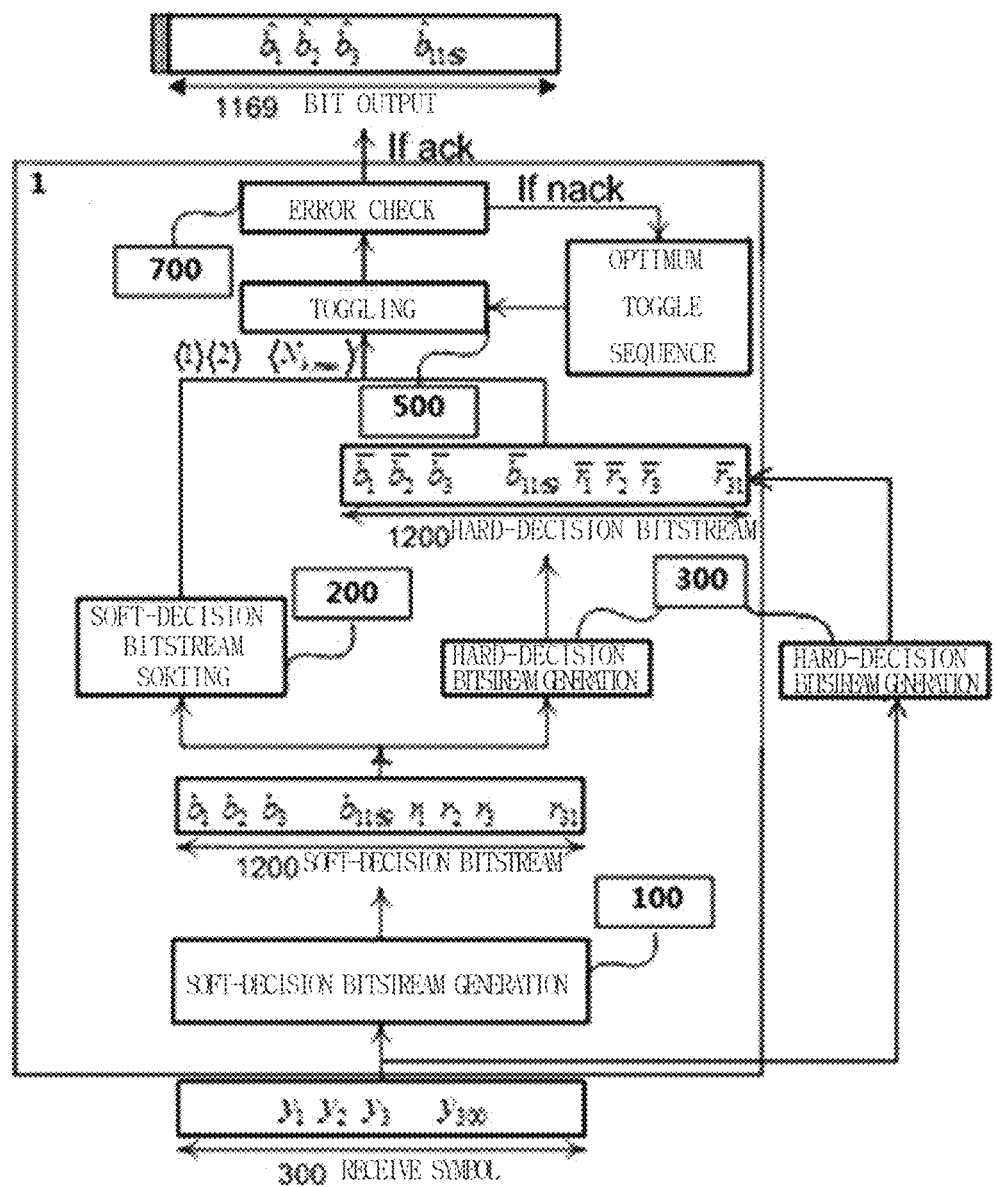
FIG. 2 is a block diagram schematically illustrating a configuration of the error detection and correction device according to the present invention.

FIG. 2 is a block diagram schematically illustrating a configuration of the error detection and correction device according to the present invention. Referring to FIG. 2, the error detection and correction device 1 according to the present invention receives receive signals (symbols) $y_i$ from a transmit side and comprises a soft decision bit stream generation unit 100, a hard decision bit stream generation unit 300, and a toggling unit 500. In addition, the error detection and correction device 1 may further comprise a soft decision bit stream sorting unit 200 and an error check unit 700. The error detection and correction device 1 according to the present invention may be a circuit built in a receiver. It is noted that the error detection and correction device according to the present invention may be implemented in various manners such as software embedded in a single circuit chip without limiting to such a configuration.

Unlike the conventional error detection method that uses a hard decision value, the error detection and correction device 1 according to the present invention is implemented using a soft decision value. The method of determining the soft decision value from the receive signal described above may similarly apply. Unlike the hard decision value, the soft decision value includes a reliability representing a reliability level as well as a bit value of "0" or "1".

In this manner, the soft decision bit stream generation unit 100 is configured to generate a soft decision bit stream having reliabilities from the receive signal $y_i$. It is assumed herein that a single packet consists of 1,200 bits, and a 16-QAM scheme is employed. Therefore, a single packet consists of 300 symbols, and each symbol consists of 4 bits.

In the soft decision bit stream generation unit 100, the soft decision value described in relation to Equation 3 can be expressed as follows:

$$\tilde{b}_{k+4i}=LLR(b_{k,i}), i=1,2,\ldots,300, k=1,2,3,4. \quad \text{[Equation 4]}$$

According to the present invention, the soft decision bit stream formed in this manner is sorted on a reliability basis. In addition, assuming that the error probability is higher as the reliability is lower, the error detection and correction capability is implemented by toggling the corresponding bit (hard decision value) having a lower reliability and applying an error detection method to the corresponding bit.

Therefore, 1,200 soft decision values are determined (sorted) on a reliability basis. This is expressed as follows:

$$\tilde{b}_{<1>}\tilde{b}_{<2>}\tilde{b}_{<3>}\ldots \tilde{b}_{<1200>} \quad \text{[Equation 5]}$$

Here, the term "sorting" means that the soft decision values are counted sequentially on a lower reliability basis until a predetermined selected maximum toggling number "$N_{b,max}$" although the soft decision bit stream is not sorted in practice A theoretical maximum toggling number "$N_{b,max}$" is set to "1,200" in the case of a soft decision bit stream of 1,200 bits. However, since the soft decision values are toggled until the predetermined number "$N_{b,max}$" equal to or smaller than "1,200" as described above according to the present invention, it is important that the soft decision bit stream is selected on a reliability basis until the maximum toggling number "$N_{b,max}$".

Figure 3:
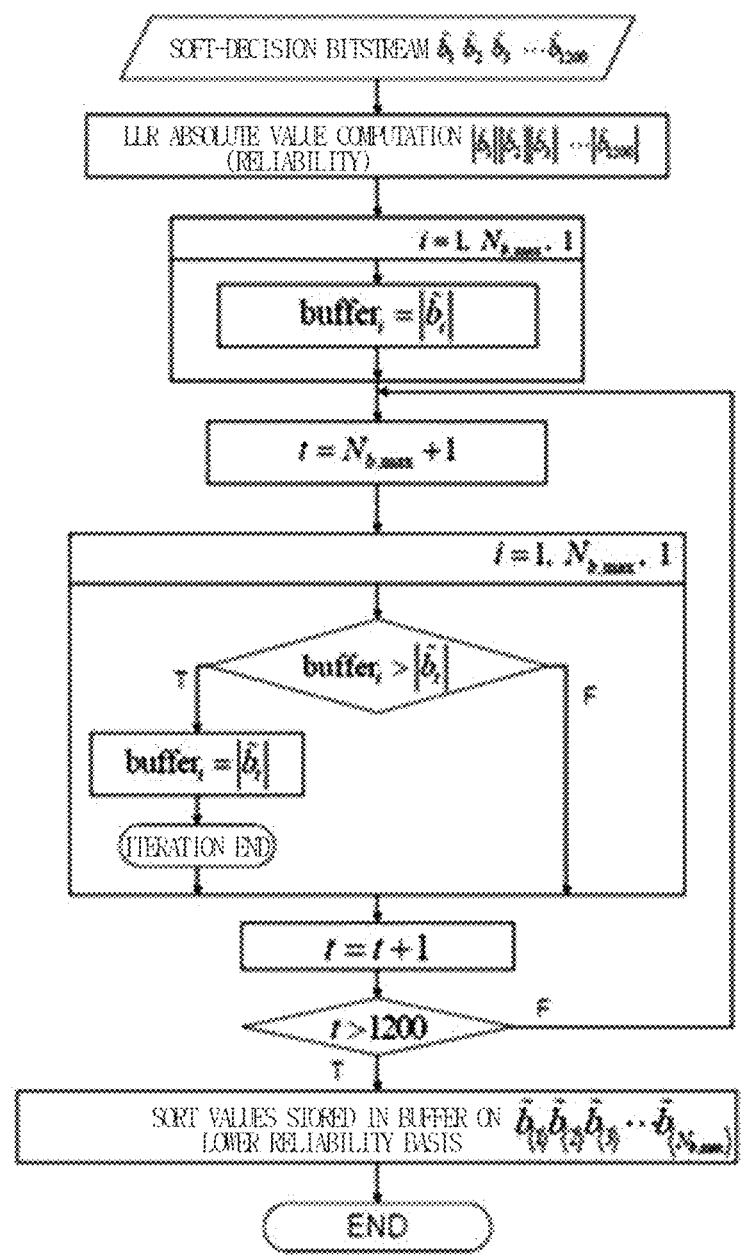
FIG. 3 is a flowchart for selecting a soft-decision bit stream using a buffer until a maximum toggling number $N_{b,max}$ on a reliability basis.

FIG. 3 is a flowchart illustrating a process of selecting the soft decision bit stream using a buffer on a reliability basis until the maximum toggling number "$N_{b,max}$". A description will now be made for a process of selecting (sorting) 1,200 bits of the soft decision bit stream on a reliability basis with reference to FIG. 3.

Figure 4:
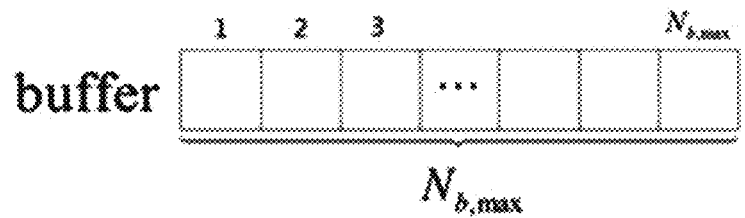
FIG. 4 illustrates a structure of a buffer for selecting soft-decision bit streams on a reliability basis.

FIG. 4 illustrates a structure of the buffer for selecting the soft decision bit stream on a reliability basis.

Out of an unsorted raw soft decision bit stream, the first soft decision value to the ($N_{b,max}$)th soft decision value are input to the buffer. The values input to the buffer are absolute values of the soft decision values of the soft decision bit stream. Then, the ($N_{b,max}$+1)th bit to the 1200th bit are sequentially compared with the $N_{b,max}$ values stored in the buffer one by one.

If the value of the soft decision bit is smaller than the value stored in the buffer, the value stored in the buffer will be replaced with the value of the soft decision bit. If the value of the soft decision bit is greater, it is compared with the next value stored in the buffer.

If the value of the soft decision bit is stored in the buffer, and the value stored in the buffer is discarded before comparison is performed for the value of the ($N_{b,max}$)th bit of the buffer, it is considered that the value of the current soft decision bit is already stored in the buffer. Therefore, there is no need to compare with the next value stored in the buffer. Accordingly, the comparison of the current soft decision bit is terminated, and a process of comparing the next soft decision bit and the buffer value is initiated.

The aforementioned process is repeated until the 1,200th soft decision bit. After the aforementioned process is completed, the buffer stores 12 values having lower reliabilities out of the 1,200 soft decision bits of the soft decision bit stream.

However, the buffer stores 12 values having lower reliabilities, and they are not sorted on a lower reliability basis. Therefore, it is necessary to sort the values stored in the buffer on a lower reliability basis.

The values subjected to the sorting can be expressed as follows:

$$\tilde{b}_{\langle 1 \rangle} \tilde{b}_{\langle 2 \rangle} \tilde{b}_{\langle 3 \rangle} \cdots \tilde{b}_{\langle N_{b,max} \rangle}$$

where the bit position corresponding to this reliability can be referred to as a ($N_{b,max}$)th bit position.

Returning to Equation 5, "$\tilde{b}_{\langle l \rangle}$" denotes a soft decision value having the lowest reliability, and "$\langle l \rangle$" denotes a bit position having the (l)th lower reliability (where l=1, 2, ... 1200). Since it is difficult to toggle all of the bits when toggling is performed in the toggling unit 500, "$N_{b,max}$" is set to an arbitrary number equal to or smaller than "1,200", and $N_{b,max}$ bit positions are determined.

As described above, in order to select (sort) the soft decision bit stream on a reliability basis, the error detection and correction device 1 according to the present invention may have the soft decision bit stream sorting unit 200.

The hard decision bit stream generation unit 300 generates a hard decision bit stream consisting of hard decision values having a value of "0" or "1". A direct target of the error detection and correction according to the present invention is the hard decision value generated from the hard decision bit stream generation unit 300.

Preferably, the hard decision bit stream generation unit 300 may obtain the hard decision bit stream from the soft decision bit stream generated from the soft decision bit stream generation unit 100. Alternatively, the hard decision bit stream may be directly obtained from the receive signal $y_i$. Therefore, a description will now be made for an embodiment of the present invention, in which a hard decision bit stream is obtained from a soft decision bit stream, but not limited thereto.

In addition, the hard decision bit stream generation unit 300 may generate a hard decision bit stream in parallel when the toggle unit 500 selects the soft decision bit stream to be toggled. As a result, the hard decision bit stream generation unit 300 can generate a hard decision bit stream in parallel without waiting for generation or sorting of the soft decision bit stream. Therefore, it is possible to improve a processing speed according to the present invention.

The following Equation 6 describes a process of obtaining a hard decision bit stream from a soft decision bit stream.

$$\bar{b}_l = \begin{cases} 1, & \text{if } 0 \le \tilde{b}_l \\ 0, & \text{else} \end{cases}, l = 1, 2, \ldots, 1200. \quad \text{[Equation 6]}$$

The toggling unit 500 toggles the bits of the hard decision bit stream sequentially on a lower reliability basis of the soft decision bit stream using the maximum toggling number $N_{b,max}$. That is, a bit having a lower reliability of the soft decision value refers to a bit having a higher error probability during transmission. Therefore, by toggling (correcting) the bit having a higher error probability first in this manner, it is possible to increase an error correction probability just by performing toggling at minimum. In general, a process of toggling $N_{b,max}$ bits can be expressed as follows:

$$\bar{b}_{l,m,toggled} = \begin{cases} \bar{b}_l, & l \notin \{\langle n \rangle | n = 1, 2, \ldots, N_{b,max}\} \\ \bar{b}_l \oplus seq_m(n), & \text{when } l = \langle n \rangle \end{cases} \quad \text{[Equation 7]}$$

where the subscript "m" of the operator "seq" refers to an index of the toggle sequence.

The following Table 1 shows a combination of toggle sequences when the maximum toggling number $N_{b,max}$ is set to "3".

TABLE 1

| position | ⟨n⟩ | | |
|---|---|---|---|
| | ⟨3⟩ | ⟨2⟩ | ⟨1⟩ |
| seq₁ | 0 | 0 | 0 |
| seq₂ | 0 | 0 | 1 |
| seq₃ | 0 | 1 | 0 |
| seq₄ | 0 | 1 | 1 |
| seq₅ | 1 | 0 | 0 |

TABLE 1-continued

| position | ⟨n⟩ | | |
|---|---|---|---|
| | ⟨3⟩ | ⟨2⟩ | ⟨1⟩ |
| seq$_6$ | 1 | 0 | 1 |
| seq$_7$ | 1 | 1 | 0 |
| seq$_8$ | 1 | 1 | 1 |

The angle-bracketed numbers ⟨1⟩, ⟨2⟩, and ⟨3⟩ denote positions having lower soft decision reliabilities. The angle-bracketed number ⟨1⟩ denotes a position of the bit having the lowest soft decision reliability, the angle-bracketed number ⟨2⟩ denotes a position of the bit having the secondly lowest reliability, and the angle-bracketed number ⟨3⟩ denotes a position of the bit having the thirdly lowest reliability.

If the toggle sequence operation "seq" results in "0," that means the corresponding bit is not toggled. If the toggle sequence operation "seq" results in "1," that means the corresponding bit is toggled. For example, in the case of the toggle sequence operation "seq$_3$", the operation "seq" results in "seq$_3$(1)=seq$_3$(3)=0" and "seq$_3$(2)=1." Therefore, only the hard decision value of the bit having the secondly lowest reliability ⟨2⟩ is toggled to the other value.

The error check unit 700 checks an error in the hard decision bit stream subjected to the toggling. Preferably, in order to operate the error check unit 700, the receive signal $y_i$ received from the transmit side contains an error detection bit. Although any type of error detection bits can be employed, a cyclic redundancy check (CRC) bit is preferably employed. For the error detection method of the error check unit 700, any method known in the art may be appropriately employed depending on the type of the error detection bit.

According to the present invention, the error check unit 700 may perform the error check for the toggled hard decision bit stream whenever the toggling unit 500 toggles the hard decision bit stream using each toggle sequence seq. For convenient description purposes, it is assumed that the CRC method is employed as the error detection method in the following description.

Referring to Table 1, for the toggle sequence operation seq$_1$, the error check (CRC) is performed while no bit is toggled. If the CRC results in "ACK," it is determined there is no error, and the corresponding hard decision bit is output as a receive signal. If the CRC results in "NACK," the process advances to the toggle sequence operation seq$_2$, so that the CRC is performed for a new hard decision value generated by toggling a single hard decision bit (b⟨1⟩) having the lowest reliability. If the CRC results in "ACK," it is determined there is no error, and the corresponding hard decision bit is output as a receive signal. If the CRC results in "NACK," the process advances to the toggle sequence operation "seq$_1$."

A probability of detecting an error increases if the CRC is performed over and over. However, in general, if the frequency of CRC is restricted to the maximum number $N_{CRC,max}$, the toggling is performed until this number $N_{CRC,max}$ to determine "ACK" or "NACK." In this manner, the CRC is performed sequentially until "ACK" is generated. When "ACK" is generated, the CRC stops, and the corresponding bit value is output. If "ACK" is not generated for overall toggling combinations, an error is declared ("NACK" is output).

However, if the CRC is performed for overall combinations in this way, $2^{N_{b,max}}$ combinations are possible. If the CRC is performed overall possible combinations, complexity increases disadvantageously.

In order to address this problem, according to the present invention, only the bit(s) having a higher error probability are toggled with a higher priority based on a soft decision reliability. Then, the bits are toggled sequentially on a lower reliability basis. Therefore, it is possible to detect and correct an error in the bit having a higher error probability as fast as possible. In particular, when two or more bits are toggled, the toggling is performed on a smaller sum basis of overall reliabilities of the soft decision values to be toggled.

A description will now be made for a method of determining an optimum toggle sequence. The method of determining the toggle sequence described above is characterized in that a sequence having a smaller sum of (absolute) soft decision values of the bits to be toggled is toggled with a higher priority.

Figure 5:
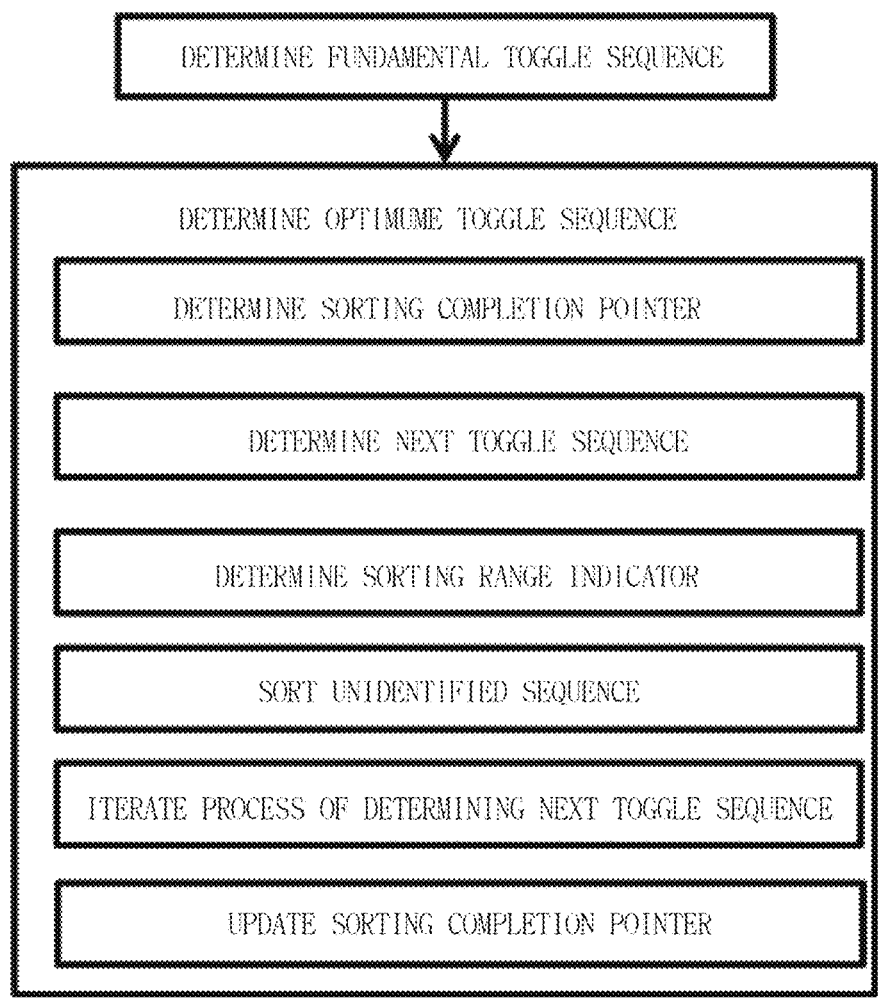
FIG. 5 is a flowchart illustrating a process of optimizing and sequentially toggling toggle sequences according to a first embodiment of the present invention.

FIG. 5 is a flowchart illustrating a process of optimizing and toggling the toggle sequence sequentially as described above according to an embodiment of the invention.

If the value "$N_{b,max}$" is determined in advance, and the maximum number of the toggle sequence is set to "$N_{CRC,max}$," the optimum toggle sequence can be expressed as follows:

$$SEQ^{opt} = \operatorname{argmin}_{N_{CRC,max}, \, l(\langle n \rangle) \in \{0,1\}, n=1,2,\ldots,N_{b,max}} \sum_{n=1}^{N_{b,max}} |\tilde{b}_{\langle n \rangle} 1(\langle n \rangle)| \quad \text{[Equation 8]}$$

where "1(l)" denotes an indicator function expressed in Equation 9 described below, "arg min$_{N_{CRC,max}}$" means $N_{CRC,max}$ indicator combinations having the minimum objective function are selected, and an optimum toggle sequence "$SEQ^{opt}$" is a matrix format including all of $N_{CRC,max}$ toggle sequences as expressed in the following Equation 10. Here, the phrase "minimum objective function" means that a sum of the (absolute) soft decision values of the bits to be toggled is minimized.

$$1(l) = \begin{cases} 1, & \text{if } l\text{th bit is toggled} \\ 0, & \text{else} \end{cases} \quad \text{[Equation 9]}$$

$$SEQ^{opt} = \begin{bmatrix} seq_1 \\ seq_2 \\ \vdots \\ seq_{N_{CRC,max}} \end{bmatrix} \quad \text{[Equation 10]}$$

Selection of the toggle sequence expressed in Equation 8 may be performed in a stepwise manner (s=1, 2, ..., $N_{b,max}$) as described below. If "$N_{b,max}$=6," and only two bits (s=2) are toggled at maximum, an optimum toggle sequence can be expressed as:

$$SEQ^{opt}_{t=2} = \begin{bmatrix} seq_1 \\ seq_2 \\ seq_3 \\ seq_4 \end{bmatrix} = \quad \text{[Equation 11]}$$

-continued $$\begin{bmatrix} [seq_1(6) & seq_1(5) & seq_1(4) & seq_1(3) & seq_1(2) & seq_1(1)] \\ [seq_2(6) & seq_2(5) & seq_2(4) & seq_2(3) & seq_2(2) & seq_2(1)] \\ [seq_3(6) & seq_3(5) & seq_3(4) & seq_3(3) & seq_3(2) & seq_3(1)] \\ [seq_4(6) & seq_4(5) & seq_4(4) & seq_4(3) & seq_4(2) & seq_4(1)] \end{bmatrix} =$$

$$\begin{bmatrix} 000000 \\ 000001 \\ 000010 \\ 000011 \end{bmatrix}$$

In Equation 8, in the case of the toggle sequence, a value of the objective function of "$seq_1(=000000)$" is "0," and values of the objective functions corresponding to "$seq_2$ (=000001)," "$seq_3(=000010)$," and "$seq_4(=000011)$" are $|\tilde{h}_{(1)}|$, $|\tilde{h}_{(2)}|$, $|\tilde{h}_{(1)}|+|\tilde{h}_{(2)}|$, respectively. Therefore, it is recognized that they are already sorted in an ascending manner in terms of the objective function.

The toggle sequence expressed in Equation 11 serves as a fundamental toggle sequence for determining the next toggle sequence sequentially determined later. Therefore, this will be referred to as a "fundamental toggle sequence." In addition, since four sequences are provided in the fundamental toggle sequence, they will be referred to as a fundamental toggle sequence group (SEQ) hereinafter.

That is, the fundamental toggle sequence group can be generalized as follows. In the case of the fundamental toggle sequence group, only two bits are toggled. Therefore, "s" is set to "2" (s=2).

$$SEQ \leftarrow \begin{bmatrix} \overbrace{0 \ldots 000}^{N_{b,max} zeros} \\ 0 \ldots 001 \\ 0 \ldots 010 \\ 0 \ldots 011 \end{bmatrix}$$

Focusing on the fundamental toggle sequence described above, it is recognized that three toggle sequences ($seq_1$, $seq_2$, and $seq_3$) are already sorted to minimize the objective function without necessity of comparison with the value of the objective function of the next toggle sequence. Therefore, it is possible to perform the CRC before an optimum toggle sequence is obtained until the next toggle sequence group $SEQ^{temp}$ (s=3). An indicator that indicates a position of the toggle sequence capable of performing the CRC regardless of the next toggle sequence in this manner will be referred to as a "sorting completion pointer CRC_ptr." The sorting completion pointer CRC_ptr indicating the sequence for which the sorting is completed in the process of the next toggle sequence $SEQ^{temp}$ (s=3) becomes "3($seq_3$)." Therefore, it is possible to perform the CRC sequentially on a smaller objective function basis even before the next toggle sequence is obtained later. Accordingly, the optimum toggle sequence can be obtained until the sorting completion pointer CRC_ptr.

In order to sort the next toggle sequence by toggling three bits (s=3) after the fundamental toggle sequence group SEQ is determined such that the objective function is minimized, first, it is recommended that the next toggle sequence group $SEQ^{temp}$ be obtained temporarily based on the following Equation 12. Here, the word "temporary" means that the sorting order of the toggle sequence can change depending on the value of the objective function later.

$$SEQ^{temp} = SEQ_{s=2}^{opt} + 2^{s-1} = SEQ_{s=2}^{opt} + 2^2 = \begin{bmatrix} 000100 \\ 000101 \\ 000110 \\ 000111 \end{bmatrix}$$ [Equation 12]

Since "s" is set to "3" (s=3) in the next toggle sequence group $SEQ^{temp}$ expressed in Equation 12, a matrix is obtained by adding "1" to the $(2^{3-1}=(2^2))$th toggle sequence bit of the fundamental toggle sequence group SEQ (i.e., $SEQ_{s=2}^{opt}$).

As described above, the toggle sequence sorted such that the current objective function is minimized ranges to "$seq_3$" as indicated by the sorting completion pointer CRC_ptr. Therefore, the toggle sequences ranging from "seq4" of the fundamental toggle sequence to the next toggle sequence are not sorted currently. That is, it is difficult to identify which objective function of the toggle sequence is minimized.

Here, it is obviously recognized that the toggle sequence having a value of (000101) has a value of the objective function larger than those of the preceding sequences (000011) and (000100). In this manner, an indicator that indicates a sequence having a value of the objective function obviously larger than those of the objective functions of the preceding sequences will be referred to as a sorting range indicator ($l_{pos}$).

A generalized form of such a sorting range indicator can be expressed as follows:

$$l_{pos} \leftarrow \text{find}\left(SEQ^{temp} = 2^{s-1} + \sum_{l=0}^{s-3} 2^l\right)$$ [Equation 13]

If "s" is set to "3" (s=3)," the sorting range indicator becomes "$2^{3-1}+2^{0}$" (=000101)" in the next toggle sequence group $SEQ^{temp}$.

In each of sequences ranging from the sequence (CRC_ptr+1) next to that indicated by the sorting completion pointer to the sequence ($l_{pos}$-1) preceding that indicated by the sorting range indicator, it is difficult to perform the sorting such that the value of the objective function is minimized unless a sum of the reliabilities of overall bits to be toggled is directly compared. Therefore, if "s" is set to "3" (s=3), it is recommended that the values of the objective functions of the sequence (000011) and the sequence (000100) be directly computed, and the sequences be sorted on a smaller objective function value basis. In this manner, in each of the sequences ranging from the sequence (CRC_ptr+1) next to that indicated by the sorting completion pointer to the sequence ($l_{pos}$-1) preceding that indicated by the sorting range indicator, it is difficult to identify the order of them unless the values of the objective functions are directly compared. Therefore, they will be referred to as "unidentified sequences," and a process of determining the order of them will be referred to as an "unidentified sequence sorting process."

The sequences ranging from the sequence indicated by the sorting range indicator $l_{pos}$ to the last sequence of the next toggle sequence group have been already sorted on a smaller objective function value basis. Therefore, there is no need for a separate sorting process.

In this manner, a process of determining (sorting) an optimum toggle sequence until "s=3" can be expressed as follows:

$$SEQ_{s=3}^{opt} = \begin{bmatrix} SEQ_{s=2}^{opt}(1: \text{CRC\_ptr}) \\ \text{sort}\begin{pmatrix} SEQ_{s=2}^{opt}(\text{CRC\_ptr}+1: \text{end}) \\ SEQ^{temp}(1: l_{pos}-1) \end{pmatrix} \\ SEQ^{temp}(l_{pos}: \text{end}) \end{bmatrix}$$ [Equation 14]

where the "sort" function means the unidentified sequence sorting process.

Then, in order to determine the next toggle sequence, the sorting range indicator CRC_ptr is updated as follows:

$$\text{CRC\_ptr} = \text{find}(SEQ_{s=3}^{opt} = 2^{s-1})$$ [Equation 15]

FIG. 6 illustrates an algorithm obtained by generalizing a method of determining an optimum toggle sequence according to the present invention.

As recognized from FIG. 6, in the toggle sequence determining method according to the present invention, the toggle sequences are optimized sequentially by generating the next toggle sequence in succession starting from the fundamental toggle sequence. In addition, the sorting range indicator CRC_ptr is incremented starting from "s=3" (CRC-ptr=3) whenever the next toggle sequence group is determined. Therefore, the fundamental toggle sequence group SEQ and the next toggle sequence group $SEQ^{temp}$ are combined into a next fundamental toggle sequence group SEQ', and the next toggle sequence group $SEQ^{temp'}$ is determined by incrementing the parameter s, so that the next toggle sequence group is repeatedly determined in succession (refer to step 10 in FIG. 6).

Here, it is noted that the next toggle sequence group is determined by reflecting the sequence sorted in the unidentified sequence sorting process. That is, if the order of the toggle sequence is changed through the unidentified sequence sorting process in the previous toggle sequence SEQ, the next toggle sequence group is determined by reflecting the changed order of the unidentified toggle sequence.

In the optimum toggle sequence determining method described above, the CRC is performed just until "$N_{CRC,max}$" to determine "ACK" or "NACK" if the sorting range indicator CRC_ptr is greater than "$N_{CRC,max}$" determined in advance. If the sorting range indicator is smaller than "$N_{CRC,max}$" the optimum toggle sequence determining method is repeated continuously until "$N_{CRC,max}$." Naturally, if "ACK" is generated while the CRC is performed sequentially until the toggle sequence indicated by the sorting range indicator (CRC_ptr) as described above, the corresponding toggled bit is output, and the method of the present invention is terminated.

Figure 7:
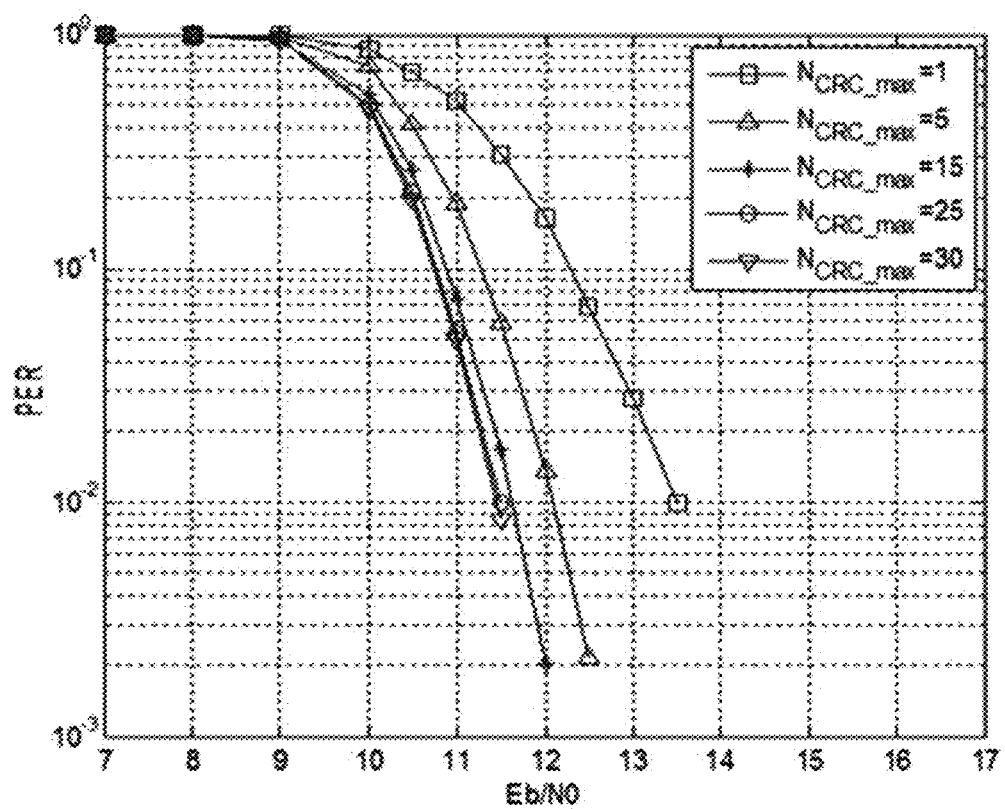
FIG. 7 illustrates a result of performance test simulation depending on various $N_{CRC,max}$ values when the maximum toggling number is fixed to "15" ($N_{b,max}$=15) according to the first embodiment of the present invention.
Figure 8:
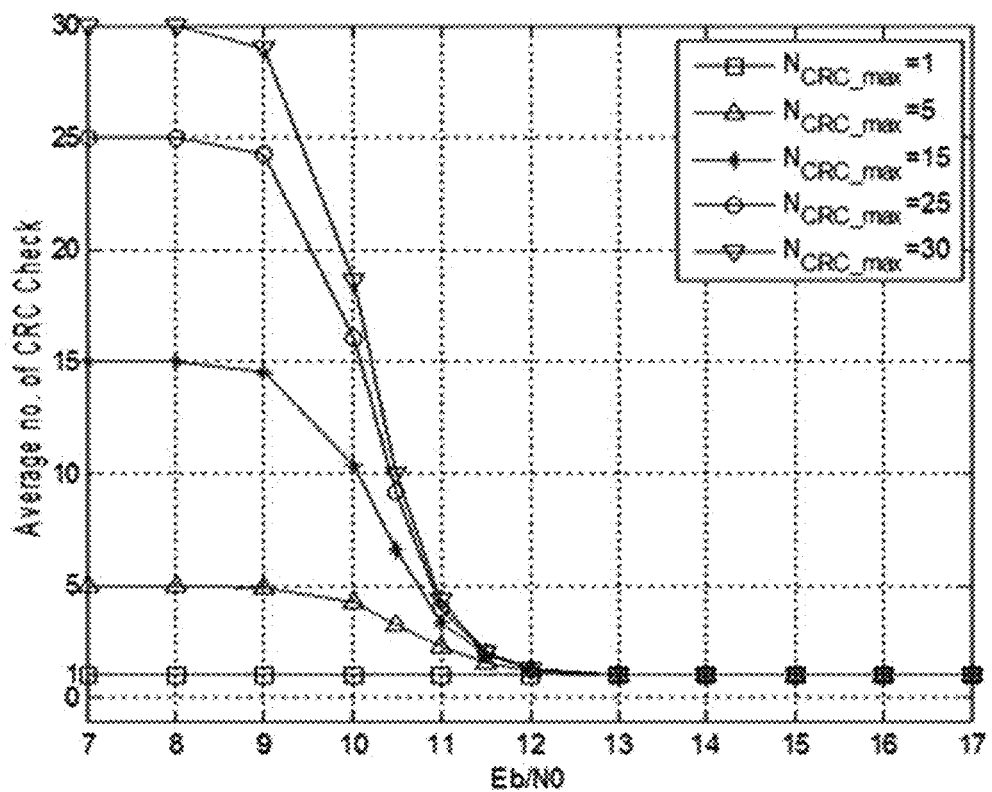
FIG. 8 illustrates average CRC test frequency under the same simulation environment as that of FIG. 7.

FIG. 7 illustrates a result of a performance test simulation according to the present invention depending on various values of "$N_{CRC,max}$" when "$N_{b,max}$" is fixed to "15" ($N_{b,max}$=5). It is recognized that error performance is improved as the value "$N_{CRC,max}$" increases from "5" to "30." FIG. 8 illustrates average CRC frequency under the same simulation environment as that of FIG. 7. It is recognized that, if the energy per bit to noise power spectral density ratio "$E_b/N_o$" is equal to or higher than 11 [dB] ($E_b/N_o \geq 11$ [dB]), the CRC is performed only five or less times in average even in the case of "$N_{CRC,max}$=30." In the 31-bit CRC, the following Equation 16 was used.

$$g(X) = +X^{31}+X^{30}+X^{26}+X^{25}+X^{24}+X^{18}+X^{15}+X^{14}+X^{12}+ \\ X^{11}+X^{10}+X^8+X^6+X^5+X^4+X^3+X+1$$ [Equation 16]

A description will now be made for a method of determining an optimum toggle sequence according to an embodiment of the present invention in detail with reference to FIGS. 9 and 10.

Referring to FIG. 9A, it is recognized that a fundamental toggle sequence group SEQ has toggle sequences having soft decision reliabilities in the order of 0.5, 1.1, 1.3, and 1.5. Focusing on the fundamental toggle sequence, it is recognized that the objective function has values of 0, 0.5, 1.1, and 1.6 (=0.5+1.1) in the sequences "$seq_1$" to "$seq_4$" so as to increase. The initial sorting completion pointer CRC_ptr indicates the third sequence, i.e., "$seq_3$." As described above, when the toggle sequence is determined by applying only the fundamental toggle sequence (that is, when toggling is performed only for two bits (s=2)), it is possible to obtain an optimum toggle sequence by directly applying the fundamental toggle sequence without a separate sorting method. Then, when three bits are toggled (s=3), the next toggle sequence group $SEQ^{temp}$ is generated additionally and temporarily based on Equation 12 described above. Here, it is noted that the subscript of the sequence "$seq_m$" is incremented from <1> having the lowest reliability for convenient description purposes, and it does not denote an actual toggling order. Since the sorting range indicator is set to "3" (s=3), the Equation 13 described above results in (0101), that is, "$seq_6$."

Figure 9:
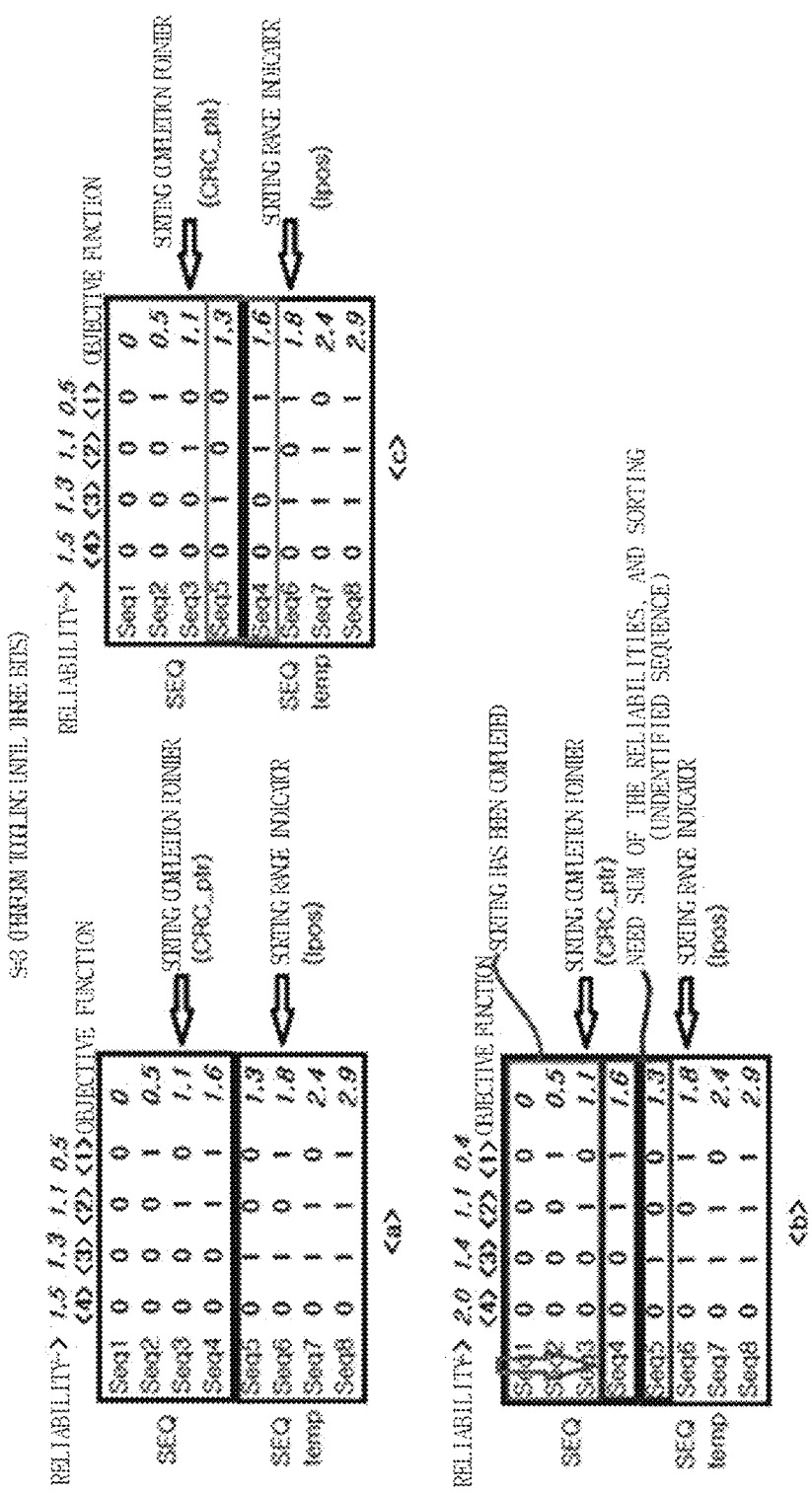
FIG. 9 illustrates the method of determining an optimum toggle sequence in detail when "s=3" according to the first embodiment of the present invention.

Referring to FIG. 9B, it is recognized that the sequences are already sorted such that the objective function increases until the sequence "$seq_3$" indicated by the sorting completion pointer (as indicated by the blue box in FIG. 9B). Therefore, in this part, the toggle sequence may be sequentially toggled without necessity of a separate reliability-based sorting process (as indicated by the green arrow). However, for each sequence ($seq_4$ and $seq_5$) ranging from the sequence (CRC_ptr+1=$seq_4$) next to that indicated by the sorting completion pointer to the sequence ($l_{pos}-1=seq_5$) preceding that indicated by the sorting range indicator, it is difficult to identify which sequence has a smaller sum of the objective function. Therefore, it is necessary to calculate the sum of the reliabilities of the directly toggled bits and sort the sequences sequentially on a smaller sum-of-reliabilities basis (unidentified sequence sorting process—as indicated by the red box in FIG. 9B). In the embodiment illustrated in FIG. 9, the sum (=1.3) of the reliabilities of the sequence "$seq_5$" is smaller than the sum (=1.6) of the reliabilities of the sequence "$seq_4$," it is necessary to perform toggling first according to the sequence "$seq_5$" rather than "$seq_4$."

Figure 10:
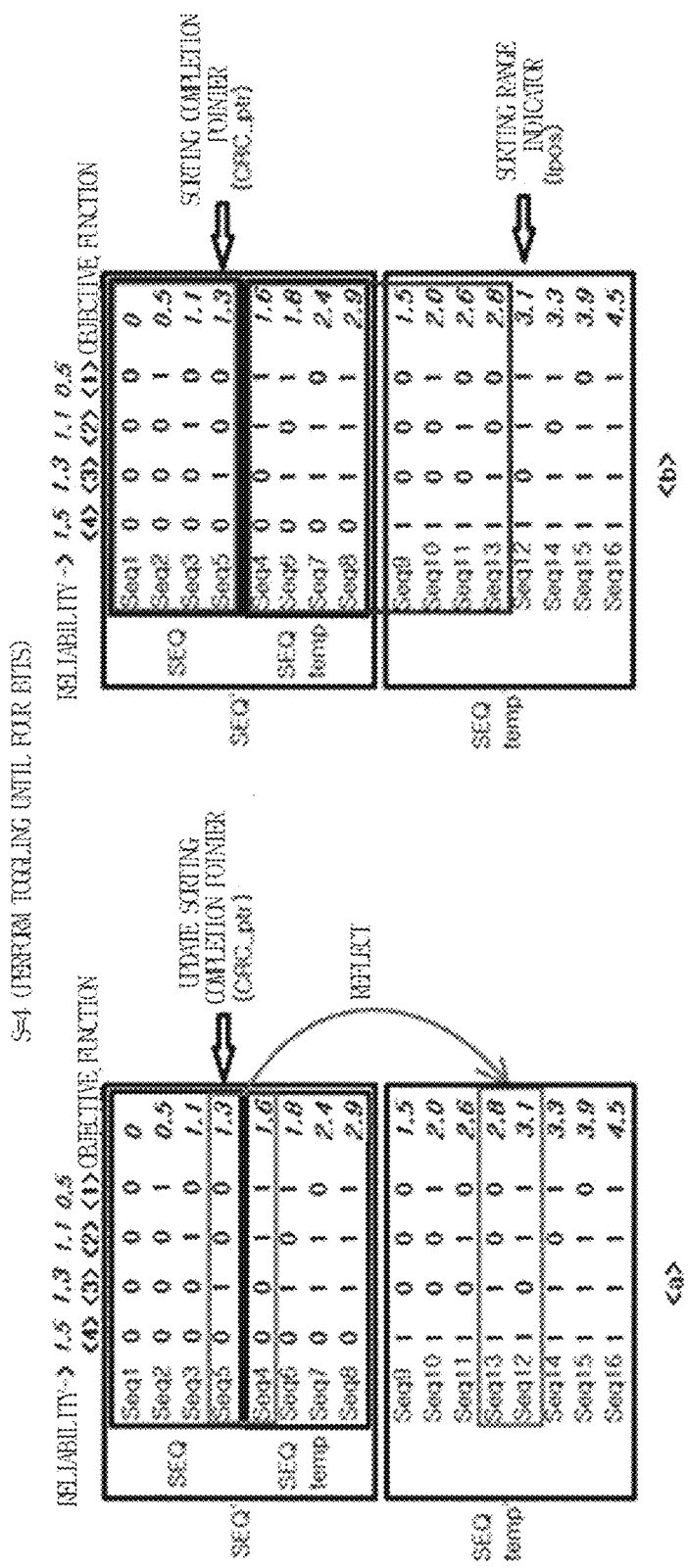
FIG. 10 illustrates the method of determining an optimum toggle sequence in detail when "s=4" according to the first embodiment of the present invention.

FIG. 10 illustrates a method of determining an optimum toggle sequence according to an embodiment when the toggling is performed until 4 bits at maximum (s=3) after the toggle sequence is determined as illustrated in FIG. 9.

First, in order to temporarily determine the next toggle sequence group $SEQ^{temp'}$ for toggling of four bits at maximum, the next toggle sequence group is determined based on Equation 12 described above in relation to FIG. 10A. In this case, a sequence group obtained by combining the previous toggle sequence group SEQ at the time of "s=3" (FIG. 9) and the next toggle sequence group $SEQ^{temp}$ is set to a new toggle sequence group SEQ (i.e., SEQ'). Therefore, a toggle sequence group $SEQ^{temp'}$ is generated by adding "1" to the "$2^{s-1}$" bits of the new toggle sequence group SEQ'. In this case, it is noted that the sorting of unidentified toggle sequences (seq$_4$ and seq$_5$) in the previous toggle sequence group SEQ' is also reflected on the next toggle sequence group SEQ$^{temp\prime}$.

Then, referring to FIG. 10B, the sorting completion pointer CRC$_{ptr}$ is updated to indicate "(0100)=seq$_5$" so that the sorting range indicator 1$_{pos}$ indicates "(1011)=seq$_{12}$." Therefore, it is necessary to directly calculate and determine the value of the objective function of the unidentified sequences (seq$_4$, seq$_6$, seq$_7$, seq$_8$, seq$_9$, seq$_{10}$, seq$_{11}$, seq$_{13}$) as described above in relation to FIG. 9. According to the embodiment of FIG. 10B, it is anticipated that the unidentified sequences are sorted in the order of seq$_9$, seq$_4$, seq$_6$, seq$_{10}$, seq$_7$, seq$_{11}$, seq$_{13}$, and seq$_8$.

Second Embodiment: Error Pattern and Error Correction Method Using Syndromes Thereof In the first embodiment describe above, it is necessary to perform the CRC method using the error check unit 700 whenever the toggling unit 500 performs toggling. In addition, even when an optimum toggle sequence is determined according to the first embodiment of the present invention, it is necessary to perform the CRC repeatedly. Therefore, there is a need to address such a problem.

Furthermore, according to the first embodiment, in the process of generating the next toggle sequence group SEC$^{temp}$ not subjected to the sorting on a reliability basis, the next toggle sequence group SEC$^{temp}$ is generated by substituting the (s+1)th bit with "1" for overall sequences of the fundamental toggle sequence group SEQ. That is, according to the first embodiment, even a sequence having no necessity of sorting is generated as the next toggle sequence group SEC$^{temp}$. In this case, if the value "N$_{crc,max}$" is small, there may be no significant difference. However, if the value "N$_{crc,max}$" is relatively large, there are a lot of sequences wasting time and resources in the next toggle sequence group SEQ$^{temp}$. Therefore, it is necessary to address such a problem and perform error correction faster.

According to the second embodiment of the present invention describe below with reference to the accompanying drawings, the error correction is performed faster by modifying the first embodiment.

For this purpose, according to the second embodiment of the present invention, there is proposed a method of determining an optimum error pattern using syndromes resulting from the CRC. More specifically, according to the second embodiment, there is provided a method of searching an error pattern (i.e., error generation function) of the toggling for error correction.

Figure 14:
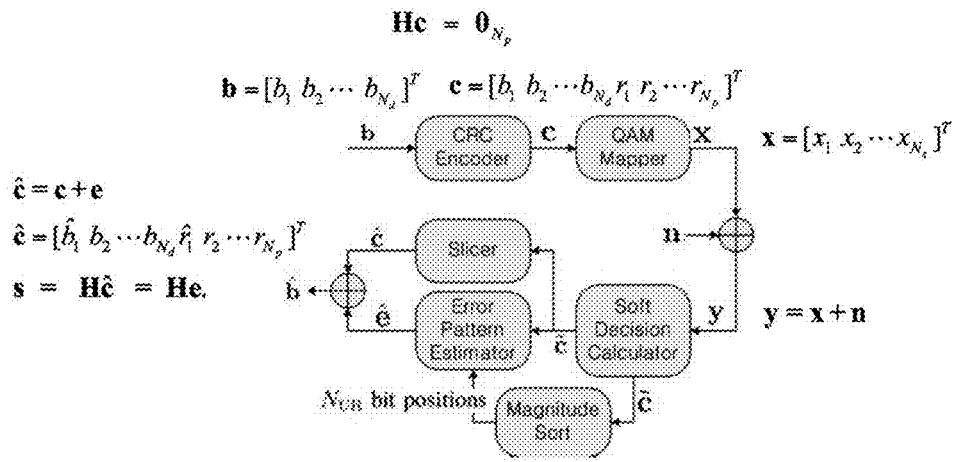
FIG. 14 is a block diagram illustrating a concept of the method of determining an error pattern according to a second embodiment of the present invention.

FIG. 14 illustrates a principle of syndrome comparison according to the second embodiment of the present invention. A syndrome H(c+e) for the hard decision value (having an error) subjected to the CRC, where "c" denotes a no-error signal transmitted to the transmit side via the CRC encoder and the QAM mapper, and "e" denotes an error signal included during data transmission, can be expressed as a sum of the syndrome Hc of the no-error signal and the syndrome He of the error signal "H(c+e)=Hc+He."

In this case, the syndrome Hc of the no-error signal is set to "0." Therefore, if the syndrome value H(c+e) for the hard decision value determined using a bit slicer is obtained, and an error pattern matching the syndrome value for the hard decision value is searched out of the syndrome values He$_j$ of each error pattern, this error pattern may be called a final error pattern generated during actual transmission. Accordingly, if toggling is then performed to match the final error pattern, it is possible to correct an error. That is, unlike the first embodiment, it is possible to search a final error pattern and correct an error through a single toggling try just by comparing syndromes and determining whether or not they match without performing toggling in practice and individually performing CRC for the toggling result.

FIG. 14 is a block diagram illustrating a CRC code system in an additive white Gaussian noise (AWGN) channel according to the second embodiment of the present invention.

For discrimination from the first embodiment, the second embodiment will be described by redefining the terminologies of the first embodiment. It is noted that the parts similar to those of the first embodiment will not be repeatedly described for simplicity purposes.

(1) An error pattern group E$_i$ (where i=N$_b$=2, 3, . . . , N$_{b,max}$) corresponds to the toggle sequence group SEQ of the first embodiment. Each error pattern group E$_i$ includes one or more error patterns e$_j$ (which is a matrix function, where j=0, 1, 2, . . . ).

In particular, the first error pattern group E$_{Nb}$, which will be described below, particularly, a fundamental error pattern group E$_2$ (where N$_b$=2) corresponds to the fundamental toggle sequence group SEQ of the first embodiment, and the second (unsorted) error pattern group E$_{Nb+1}$(') corresponds to the next toggle sequence group SEQ$^{temp}$ of the first embodiment.

(2) A syndrome group S$_i$ is obtained by grouping syndromes of each error pattern of the error pattern group E$_i$ to match the error pattern group E$_i$ and includes the syndrome values s$_j$ for each error pattern e$_j$.

(3) "N$_d$" denotes the number of bits of the received data, and "N$_p$" denotes the number of parity bits (the number of bits of the syndrome) within the received data bits.

(4) "N$_{b,max}$" of the second embodiment denotes a maximum number of the compared error patterns (maximum error pattern bit number) according to the present invention and corresponds to the maximum toggling number N$_{b,max}$ of the first embodiment. That is, "N$_b$" is set to "2" to "N$_{b,max}$" (N$_b$=2, 3, 4, . . . , N$_{b,max}$). Here, since the toggling is performed depending on the final error pattern determined in the second embodiment, the maximum error pattern bit number N$_{b,max}$ according to the second embodiment has the same meaning as that of the maximum toggling number N$_{b,max}$ of the first embodiment. In FIG. 14 and subsequent drawings, "N$_{b,max}$" may also be expressed as "N$_{UR}$".

(5) "N$_{max}$" denotes a maximum error pattern correction number and corresponds to "N$_{crc,max}$" of the first embodiment.

Although the maximum error pattern correction number N$_{max}$ is preferably set to a triple of "N$_{b,max}$" according to the second embodiment of the present invention, it may change depending on an environment used by a user in practice (depending on which one of high correction performance or high correction speed is required).

(6) A sorting completion pointer ptr$_{Nb}$ corresponds to the sorting completion pointer CRC_ptr of the first embodiment.

Figure 15:
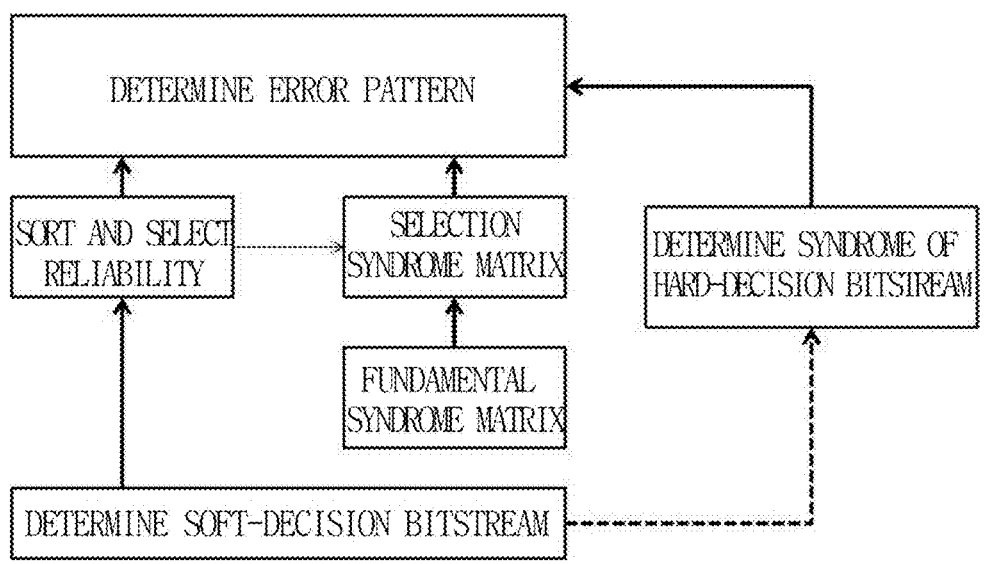
FIG. 15 is a flowchart illustrating the process of determining an error pattern according to the second embodiment of the present invention.

A description will now be made for a method of determining an error pattern according to the second embodiment of the present invention with reference to FIGS. 14 and 15.

First, the receive side receives a signal transmitted from the transmit side with an error. Similar to the first embodiment, the receive side generates a soft decision bit stream having a reliability using the soft decision bit stream generation unit 100 (in a process of generating the soft decision bit stream).

Preferably, according to the second embodiment of the present invention, the soft decision bit stream is used in the next processes such as a process of determining a hard decision syndrome and a process of sorting and selecting a soft decision reliability.

In the process of determining a hard decision syndrome, the hard decision bit stream generation unit 300 (for example, bit slicer) determines a hard decision value from the soft decision bit stream, and determines a syndrome of the hard decision value through a CRC of the error check unit for the hard decision bit stream. Alternatively, similar to the first embodiment, in the process of determining a hard decision value, the method of directly determining a hard decision bit stream from a received signal may be employed instead of the method of determining a hard decision value from a soft decision bit stream.

The hard decision bit stream determined through the process of determining a hard decision syndrome includes an error "e." Therefore, as described above, an error pattern may be determined by comparing the syndrome value obtained through the CRC and an error pattern syndrome Se obtained through the process of determining an error pattern syndrome, which will be described below, and determining whether or not they match each other. In an exemplary signal described below, the hard decision syndrome "s" is set to "[0 0 0 0 0 1 0 0 0 1 1 0]$^T$" (the CRC function (g(x)) used in the syndrome determination will be described below). That is, it is an object of the second embodiment of the present invention to compare error pattern syndromes later to determine an error pattern having such a syndrome as the final error pattern.

A description will now be made for the following exemplary signal illustrated in FIG. 17 for convenient description purposes. In the exemplary signal, "$N_d$=20," "$N_p$=12," "$N_{b,max}$=$N_{UR}$=5," and "$N_{max}$=3$N_{UR}$=15."

In the process of sorting and selecting soft decision reliabilities, the soft decision bit streams are sorted on a smaller reliability (absolute value) basis, and bit positions are selected as many as the maximum error pattern bit number $N_{b,max}$ on a smaller reliability (absolute value) basis ($P_{UR}$). The maximum error pattern bit number $N_{b,max}$ may be set arbitrarily by a user. As the maximum error pattern bit number $N_{b,max}$ increases, the error correction performance is improved.

In the example described above, the maximum error pattern bit number $N_{b,max}$ is set to "5," and 5 bit positions having a smaller reliability (absolute value) are selected. In the example described above, on a smaller reliability (absolute value) basis, the soft decision reliabilities are sorted in the order of the 9th bit ((−)0.02), the 22nd bit (0.35), the 13th bit (0.40), the 28th bit ((−)0.47), and the 21st bit ((−)1.23). Therefore, in this example, the bit positions are determined in the order of the 9th bit, the 22nd bit, the 13th bit, the 28th bit, and the 21st bit ($P_{UR}$=(9, 22, 13, 28, and 21)).

In the process of determining a fundamental syndrome matrix, the fundamental syndrome matrix refers to a syndrome matrix obtained by performing the CRC for overall error patterns within a range of "$N_{b,max}$" out of matrices of the syndromes "$s_j$" of the error pattern "$e_j$." That is, there are $2^{Nb,max}$ error pattern syndromes. The CRC of the aforementioned example is performed as follows:

$$g(X)=X^{12}+X^{11}+X^3+X^2+X+1 \quad \text{[Equation 17]}$$

Then, out of the determined fundamental syndrome matrix "H," a selected syndrome matrix "H−" is determined by selecting syndromes of the error bits corresponding to the bit positions determined on a smaller reliability basis in the process of sorting and selecting reliabilities.

In the example described above with reference to FIG. 17, the bit positions are selected in the order of the 9th bit, the 22nd bit, the 13th bit, the 28th bit, and the 21st bit. Therefore, a selected syndrome matrix $\overline{H}$ of the matrix [$s_9$ $s_{22}$ $s_{13}$ $s_{28}$ $s_{21}$] consisting of the 9th syndrome, the 22nd syndrome, the 13th syndrome, the 28th syndrome, and the 21st syndrome is determined (refer to FIG. 18).

According to the second embodiment of the present invention, in order to determine the final error pattern, it is important to determine the (final) error pattern similar to that of the hard decision syndrome through a minimum number of processes as described above. For this purpose, for the bit positions determined in the process of sorting and selecting the soft decision reliability of the received signal, it is necessary to sort error patterns on a higher error probability basis, that is, on a smaller sum-of-reliabilities basis. For this purpose, a process of determining the error pattern described below is employed.

Figure 16:
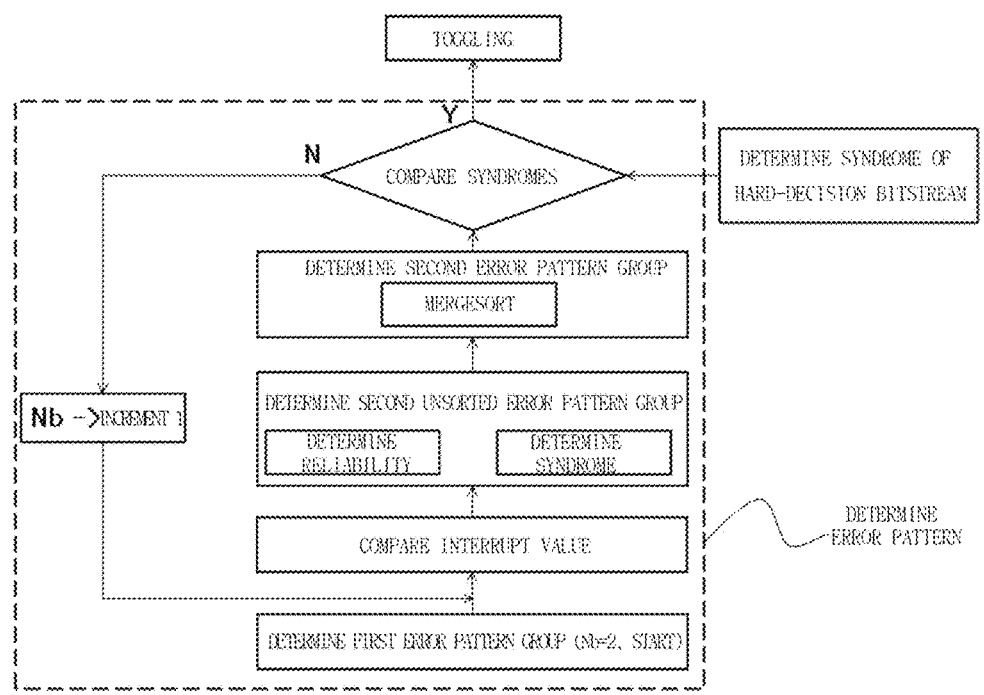
FIG. 16 is a flowchart illustrating the process of determining an error pattern in more detail according to the second embodiment of the present invention.

Referring to FIG. 16, in the process of determining error patterns, the corresponding error pattern syndromes are sequentially compared with the hard decision syndromes on a reliability basis of the error patterns determined through the method of sorting error patterns described below to determine whether or not they match each other. If they match each other, the corresponding error pattern is determined as a final error pattern, which represents a bit where an error occurs in practice. Accordingly, the error is corrected by toggling the corresponding bit in the toggling process.

Therefore, according to the second embodiment of the present invention, the error correction speed changes depending on how efficiently the process of sorting error patterns is designed. Therefore, a design of the process of sorting error patterns is very important. A description will now be made for the process of sorting error patterns in detail. Hereinafter, drawings used to describe the second embodiment relate to the exemplary signal of FIG. 17.

Figures 19, 20:
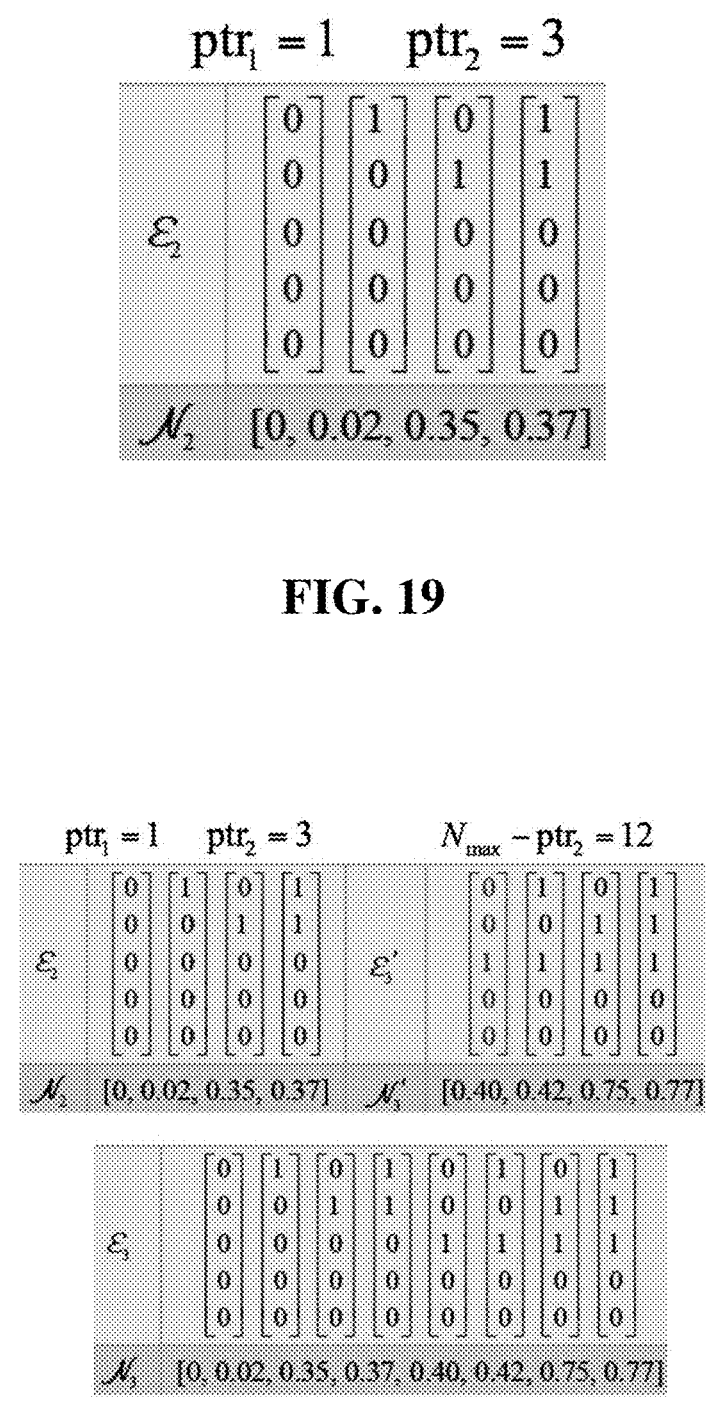

First, the first error pattern group $E_{Nb}$ is determined. When the error pattern is determined initially, the error pattern bit number $N_b$ is set to "2" ($N_b$=2). Hereinafter, this will be referred to as a fundamental error pattern group $E_2$. Since "$N_b$=2," it is assumed that the fundamental error pattern group has an error in two bits at maximum. Under this assumption, the fundamental error pattern group as a set of error patterns representing this condition is illustrated in FIG. 19.

Focusing on the fundamental error pattern group, it is recognized that the error patterns are sorted on a reliability basis as the error pattern is incremented from the least significant bit. Therefore, the first error pattern group $E_2$ (where $N_b$=2) has a form of the fundamental error pattern group described above in any cases.

The first error pattern group may change as this process of determining the error pattern is performed repeatedly (through a plurality of cycles). Although described below, if the error pattern is not yet determined even through the syndrome comparison process, the second error pattern group $E_{Nb+1}$ of the corresponding cycle becomes the first error pattern group of the new cycle ($E_{Nb}$ ($E_{Nb}\leftarrow E_{Nb+1}$)). Since the first cycle is carried out when "$N_b$=2," the case of "$N_b$=3" corresponds to the second cycle. Whenever the cycle is carried out one by one, the error pattern bit number $N_b$ is incremented starting from "2." For example, in the second cycle ($N_b$=3), the second error pattern group $E_4$ is determined based on the first error pattern group $E_3$, and the same syndrome is searched by comparing the syndrome with the hard decision syndrome based on the second error pattern group. However, if the same syndrome is not searched through the corresponding cycle ($N_b=3$), the second error pattern group $E_4$ of the corresponding cycle ($N_b=3$) is set to the new first error pattern group $E_4$ of the next cycle ($N_b=4$). That is, in the method of determining the error pattern according to the second embodiment of the present invention, if the same syndrome is not searched in the corresponding cycle, the error pattern bit number $N_b$ is incremented, and the second error pattern group $E_{Nb+1}$ of the previous cycle becomes the first error pattern group $E_{Nb}$ of the next cycle, so that the next cycle is carried out.

As the first error pattern group $E_{Nb}$ is determined, the second unsorted error pattern group $E_{Nb+1}'$ is determined. For this purpose, first, a process of comparing the next interrupt value is carried out. Here, the "unsorted(')" means that, although the (second) unsorted error pattern is sorted on a reliability basis, it is necessary to compare with the reliability of the first error pattern and perform sorting on a reliability basis. In the process of comparing the interrupt value described above, the interrupt value is compared with the number of error patterns of the first error pattern group.

According to the second embodiment of the present invention, the "interrupt value" refers to a value obtained by subtracting the bit position $ptr_{Nb}$ indicated by the first sorting completion pointer from the maximum error pattern correction number $N_{max}$ ("interrupt value"=$N_{max}-ptr_{Nb}$).

The process of comparing the interrupt value is performed to improve the error pattern sorting speed by excluding an error pattern having no necessity of sorting.

The first sorting completion pointer $ptr_{Nb}$ refers to a position of the error pattern $[e_2^{Nb}]$ in which only the $(N_b)$th bit out of the first error pattern group $E_{Nb}$ is set to "1."

For example, in the case of "$N_b=2$," the first sorting completion pointer refers to a position of the error pattern [0 1 0 0 0]. As illustrated in FIG. 20, in the case of the aforementioned exemplary signal, the error pattern [0 1 0 0 0] is positioned in the third position of the first error pattern function $E_2$ (already sorted on a reliability basis). Therefore, the first sorting completion pointer $ptr_2$ is set to "3."

If the interrupt value is equal to or greater than the number of error patterns of the first error pattern group $E_{Nb}$, it is necessary to perform sorting for overall error patterns of the second error pattern group $E_{Nb}$ which will be determined later. Therefore, the second unsorted error pattern group $E_{Nb+1}'$ is determined by setting the $(N_b+1)$th bit to "1" for overall error patterns of the first error pattern group $E_{Nb}$.

Figures 21, 22:
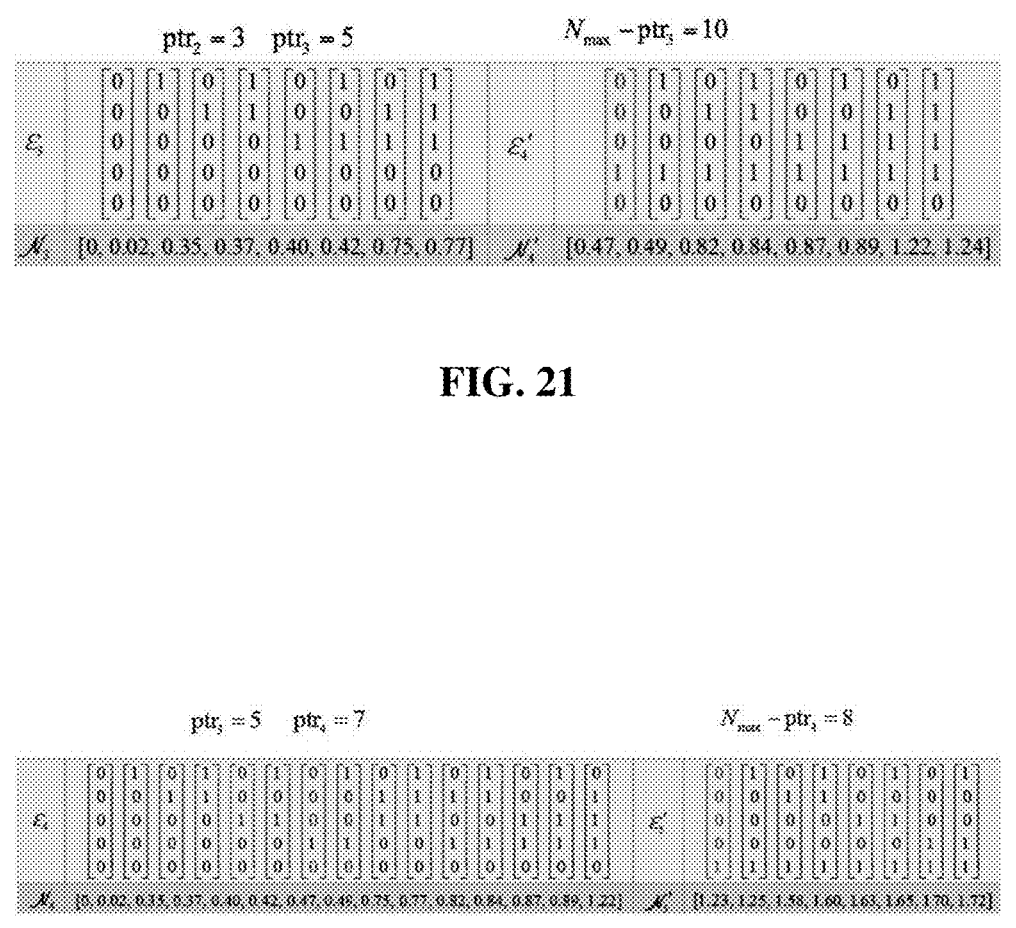

Referring to FIG. 21, for the exemplary signal of FIG. 17, if "$N_b=3$," "$N_{max}$" is set to "15," and "$ptr_3$" is set to "5," so that the interrupt value becomes "10" ($N_{max}-ptr_3=10$). Since the number of error patterns of the first error pattern group $E_3$ is set to "8" in total, the interrupt value is greater than the number of error patterns of the first error pattern group. Therefore, for overall error patterns of the first error pattern group, the second unsorted error pattern group $E_4'$ is determined by setting the $(N_b+1)$th bit (i.e., the fourth bit) to "1."

If the interrupt value is smaller than the number of error patterns of the first error pattern group $E_{Nb}$, it is possible to improve the sorting speed by excluding error patterns having no necessity of sorting out of the second error pattern group $E_{Nb}$. Therefore, the second unsorted error pattern group $E_{Nb+1}'$ is determined by setting the $(N_b+1)$th bit to "1" only for the error patterns until the interrupt value out of the first error pattern group $E_{Nb}$.

Referring to FIG. 22, for the exemplary signal of FIG. 17, in the case of "$N_b=4$," the first sorting completion pointer $ptr_4$ indicates a position of the error pattern [0 0 0 1 0]. In the case of the aforementioned exemplary signal, the error pattern [0 0 0 1 0](already sorted on a reliability basis) is positioned in the seventh position in the first error pattern function $E_4$. Therefore, the first sorting completion pointer $ptr_4$ becomes "7."

In this case ($N_b=4$), "$N_{max}$" is set to "15," and "$ptr_4$" is set to "7," so that the interrupt value is set to "8" ($N_{max}-ptr_4=8$). Since the number of error patterns of the first error pattern group $E_4$ is set to "15" in total (where, since "$N_{max}=15$," the 16th and subsequent error patterns of the second unsorted error pattern group $E_4'$ are not considered, which will be described in more detail in a mergesort process below), and the interrupt value is smaller than the number of error patterns of the first error pattern group, the second unsorted error pattern group $E_5'$ is determined by setting the fifth bit to "1" only for the error patterns until the interrupt value (from the first error pattern to the eighth error pattern) out of the first error pattern group $E_4$.

Then, (a sum of) the reliabilities of each error pattern of the second unsorted error pattern group $E_{Nb+1}$ are determined. The reliabilities of each error pattern of the second unsorted error pattern group are determined based on the reliabilities of the first error pattern group. As described above, according to the second embodiment of the present invention, as the value of "$N_b$" increases, the process of determining the error pattern is cycled. Therefore, it is considered that the reliabilities of each error pattern of the first error pattern group are determined based on the reliabilities of each error pattern of the second error pattern group $E_{Nb}$ in the previous cycle. In the initial cycle, the reliability of the fundamental error pattern group is already determined (refer to FIG. 19).

Preferably, the reliabilities of each error pattern of the second unsorted error pattern group $E_{Nb+1}'$ may be determined by adding the reliability of the error pattern having only the $(Nb+1)$th bit set to "1" to each of the error patterns of the first error pattern group $E_{Nb}$.

Referring to FIG. 21, it is recognized that, in the case of "$N_b=3$" in the aforementioned exemplary signal, the reliabilities of error patterns of the second unsorted error pattern group $E_4'$ are determined fast by adding the reliability (0.47) of the error pattern [0 0 0 0 1 0], in which only the $(N_b+1)$th bit is set to "1," to the reliabilities of each error pattern of the reliability group $N_3$ of the first error pattern group $E_3$ determined already.

Then, the syndromes of each error pattern of the second unsorted error pattern group are determined. Similar to the process of determining the reliability described above, the syndromes of each error pattern of the second unsorted error pattern group are determined based on the syndromes of the first error pattern group.

Preferably, the selection syndrome matrix described above is used in order to obtain the syndromes of error patterns. The syndrome of the corresponding error pattern can be obtained by calculating a desired syndrome of the error pattern based on the selection syndrome matrix as described below.

The following Equation 18 describes a method of obtaining a syndrome of the error pattern "$e_3$" [1 1 0 0 0]. From the selection syndrome matrix [$s_9$ $s_{22}$ $s_{13}$ $s_{28}$ $s_{21}$] already determined, the first and second columns $s_9$ and $s_{22}$ correspond to "1" of the desired error pattern. Therefore, these two syndrome values are subjected to exclusive-OR (XOR) so that the syndrome of the error pattern $e_3$ can be determined.

$$\overline{H}\overline{e}_3[s_9 \quad s_{22} \quad s_{13} \quad s_{28} \quad s_{21}] \begin{bmatrix} 1 \\ 1 \\ 0 \\ 0 \\ 0 \\ 0 \end{bmatrix} = s_9 \oplus s_{22}$$ [Equation 18]

Using this method, it is possible to determine a syndrome of the error patterns of the second unsorted error pattern group $E_{Nb+1}'$ from the syndrome of the error patterns of the first error pattern group $E_{Nb}$ in a vary fast manner as described below. Preferably, according to the second embodiment of the present invention, it is possible to determine syndromes of each error pattern of the second unsorted error pattern group $E_{Nb+1}'$ by performing XOR operation between the syndrome of the error pattern having only the (Nb+1)th bit set to "1" and the syndrome of each error pattern of the first error pattern group $E_{Nb}$.

Figures 23, 24:
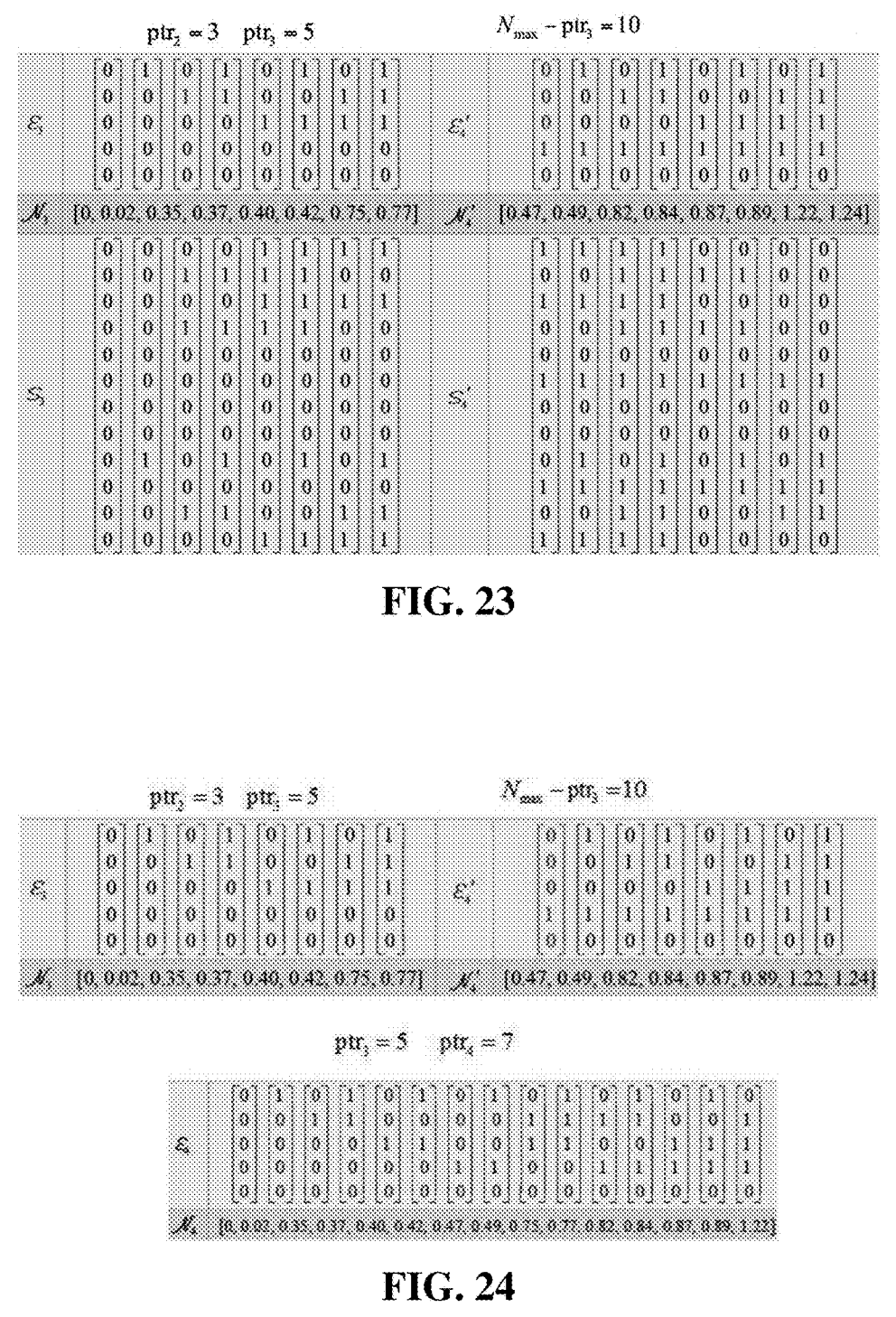

In the example of FIG. 23, it is recognized that, in the case of "$N_b=3$," the reliability of the second unsorted error pattern group $E_4'$ is determined fast by performing XOR operation between the syndrome of each error pattern of the syndrome group $S_3$ of the first error pattern group $E_3$ determined already and the syndrome [1 0 1 0 0 1 0 0 0 1 0 1]) of the error pattern [0 0 0 0 1 0] having the ($N_b$+1)th bit (fourth bit) set to "1."

Until this stage, the error codes are not yet unsorted from the pattern next to the error pattern indicated by the first sorting completion pointer to the last error pattern of the second unsorted error pattern group out of the first error pattern group $E_{Nb}$ and the second unsorted error pattern group $E_{Nb+1}'$ (as described above, the sorting has been already performed within each error pattern group on a reliability basis). Then, the second error pattern group $E_{Nb+1}$ is determined by sorting the unsorted error patterns on a reliability basis using a mergesort algorithm. The mergesort refers to an algorithm of merging two or more sublists to produce only one new sublist sorted on a top-down or bottom-up basis.

Referring to FIG. 24, in the case of "$N_b=3$," the first error pattern group $E_3$ is sorted until the fifth bit indicated by the first sorting completion pointer $ptr_3$. The bits ranging from the unsorted sixth bit (next to the bit indicated by the sorting completion pointer $ptr_3$) to the last bit of the second unsorted error pattern group $E_4'$ are sorted on a reliability basis using a mergesort algorithm. That is, the second error pattern group $E_4$ is determined by merging the first error pattern group $E_3$ and the second unsorted error pattern group $E_4'$ on a smaller reliability basis using a mergesort algorithm.

It is noted that, in this case, if the number of the sorted error patterns of the second error pattern group $E_4$ is greater than the maximum error correction pattern number $N_{max}$, the second error pattern group $E_{Nb+1}$ is determined by applying the mergesort until the maximum error correction pattern number $N_{max}$. In the method of sorting error patterns according to the present invention, the sorting is performed until the maximum error correction pattern number $N_{max}$. Therefore, error bits exceeding the maximum error correction pattern number $N_{max}$ when sorted using the mergesort algorithm are not used in the process of sorting error patterns according to the second embodiment of the present invention.

The maximum error correction pattern number $N_{max}$ is set to "15" in the example described above. However, if the sorting is performed sequentially using a mergesort algorithm, all of the error patterns of the second unsorted error pattern group and the first error pattern group are sorted into "16" error patterns. Therefore, the second error pattern group $E_{Nb}$ having the error patterns corresponding to the maximum error correction pattern number $N_{max}$ are determined by excluding the last 16th error pattern (in this example, it is recognized that the error code [1 1 1 1 0] having the highest reliability is excluded from the second error pattern group $E_4$).

Preferably, in the mergesort algorithm describe above, the error patterns ranging from the error pattern next to that indicated by the first sorting completion pointer $ptr_{Nb}$ to the last error pattern of the first error pattern group $E_{Nb}$ are sorted into the first mergesort group, and the error patterns ranging from the initial error pattern to the last error pattern of the second unsorted error pattern group $E_{Nb+1}'$ are sorted into the second mergesort group, so that the first and second mergesort groups are merged into a single sort group. It is noted that, even in this case, if the number of error patterns of the second error pattern group $E_{Nb+1}$ is greater than the maximum error correction pattern number $N_{max}$, the mergesort is applied just until the maximum error correction pattern number $N_{max}$ as described above.

In the example of FIG. 24 ($N_b=3$), the bits ranging from the fifth bit indicated by the first sorting completion pointer $ptr_3$ to the 8th (last) bit of the first error pattern group $E_3$ are set to the first mergesort group, and the error patterns ranging from the first error pattern of the second unsorted error pattern group $E_4'$ to the 8th error pattern are set to the second mergesort group. Then, the bits are sorted from each group one by one on a reliability basis into a single group (second error pattern group).

More preferably, using the mergesort algorithm described above, it is possible to automatically sort the error bits not yet subjected to the mergesort just by applying the mergesort until the last error pattern of any one of the first and second mergesort groups.

Since each of the first and second mergesort groups has been already sorted on a reliability basis, the remaining error patterns of the other group are sorted on a reliability basis just by applying the mergesort until the last bit of any one of the first and second mergesort groups. In the example described above, if the mergesort is applied until the last error pattern [1 1 1 0 0] (having a reliability of "0.77") of the first error pattern group $E_3$, the error patterns ranging from the third error pattern [0 1 0 1 0](having a reliability of 0.82) of the second unsorted error pattern group $E_4'$ to the last error pattern of the second unsorted error pattern group are already sorted. (Note that the last error pattern [1 1 1 1 0] of the second unsorted error pattern group is positioned in the 16th position higher than the maximum error correction pattern number $N_{max}$, so that this error pattern is not determined as the second error pattern group as described above).

In this manner, since there is no need to unnecessarily apply the mergesort process to the error patterns that have been already sorted, it is possible to determine the second error pattern group faster and improve the error correction speed.

Then, a process of comparing syndromes for determining an error pattern having the same syndrome of the error pattern is performed by comparing the determined syndromes of each error pattern of the second error pattern group with the hard decision syndrome on a reliability basis.

More specifically, in the process of comparing syndromes, each syndrome ranging from the error pattern indicated by the first sorting completion pointer $ptr_{Nb}$ to the error pattern indicated by the second sorting completion pointer $ptr_{Nb+1}$ is compared with the hard decision syndrome of the received signal to identify whether or not they match each other. If there is no matching error pattern, "$N_b$" is incremented, and the next cycle is carried out by determining the second error pattern group as the first error pattern group of the next cycle.

It is noted that, if the second sorting completion pointer $ptr_{Nb+1}$ is greater than the maximum error correction pattern number $N_{max}$, the comparison of syndromes is performed just until the error pattern corresponding to the maximum error correction pattern number $N_{max}$.

In the example of FIG. 24, in the case of "$N_b=3$," the first sorting completion pointer $ptr_3$ indicates the fifth error pattern, and the second sorting completion pointer $ptr_4$ indicates the seventh error pattern. Therefore, the error patterns ranging from the sixth error pattern (error bit next to the pointer $ptr_3$) to the seventh error pattern are compared with the hard decision syndrome on a reliability basis.

FIGS. 22 to 25 illustrate a process of determining the final error pattern by comparing error patterns when "$N_b=4$" and "$N_b=5$."

In FIG. 22, when "$N_b=4$," the interrupt value is set to "8." However, the number of error patterns of the second unsorted error pattern group $E_5'$ is greater than the interrupt value. Therefore, only eight error patterns are determined as the second unsorted error pattern group $E_5'$. A method of determining reliabilities and syndromes of each error pattern of the second unsorted error pattern group is the same as that described above. Then, the second error pattern group $E_5$ is determined as described in relation to FIG. 25 by applying a mergesort algorithm. Since the maximum error correction pattern number $N_{max}$ is set to "15," the second error pattern group $E_5$ has fifteen error patterns. It is noted that, although the first sorting completion pointer $ptr_4$ is set to "7," the second sorting completion pointer $ptr_5$ is set to "6" which is greater than maximum error correction pattern number $N_{max}$ (In this case, the second error pattern group $E_5$ has the same error patterns as those of the first error pattern group $E_4$).

As described above, since the second sorting completion pointer ($ptr_5=16$) is greater than the maximum error correction pattern number ($N_{max}=15$), only the syndrome of the error pattern corresponding to the maximum error correction pattern number $N_{max}$ is compared with the hard decision syndrome. Since the error pattern to be searched from the exemplary signal is [0 0 0 0 0 1 0 0 0 1 1 0], it is recognized that the syndrome of the 15th error pattern [0 1 1 1 0] of the second error pattern group $E_5$ matches the hard decision syndrome.

Then, the bits corresponding to the error pattern are toggled in the received signal, so that it is possible to correct an error and output corrected bits. That is, if the error pattern is set to [0 1 1 1 0], errors occur in the second, third, and fourth bit positions (in the 22nd, 13th, and 28th bits) on a lower reliability basis. Therefore, it is possible to correct errors by toggling the corresponding 22nd, 13th, and 28th bits (refer to FIG. 26).

Figure 27:
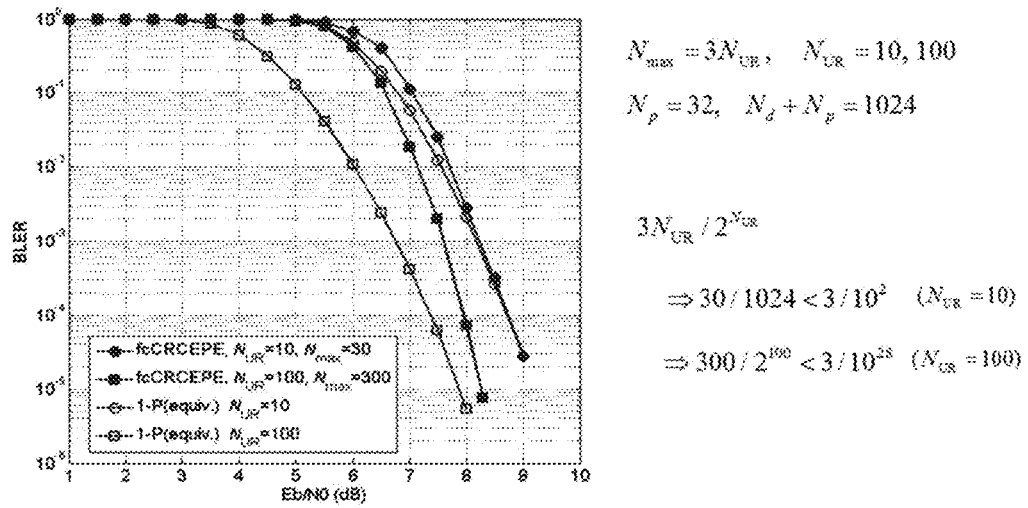
FIGS. 27 and 28 are graphs for comparing error correction performance (such as block error rate (BLER)) and complexity between the present invention and the prior art.

FIG. 27 is a graph for comparing error correction performance such as a block error rate (BLER) and complexity with those of the techniques of the prior art (the line fcCRCEPE denotes performance according to the second embodiment of the present invention, in which the 4-QAM scheme is employed). Referring to FIG. 27, as "dB" increases, nearly similar error correction performance is exhibited. However, complexity is remarkably reduced. Therefore, it is recognized that the method according to the second embodiment of the present invention is superior to the techniques of the prior art.

Figure 28:
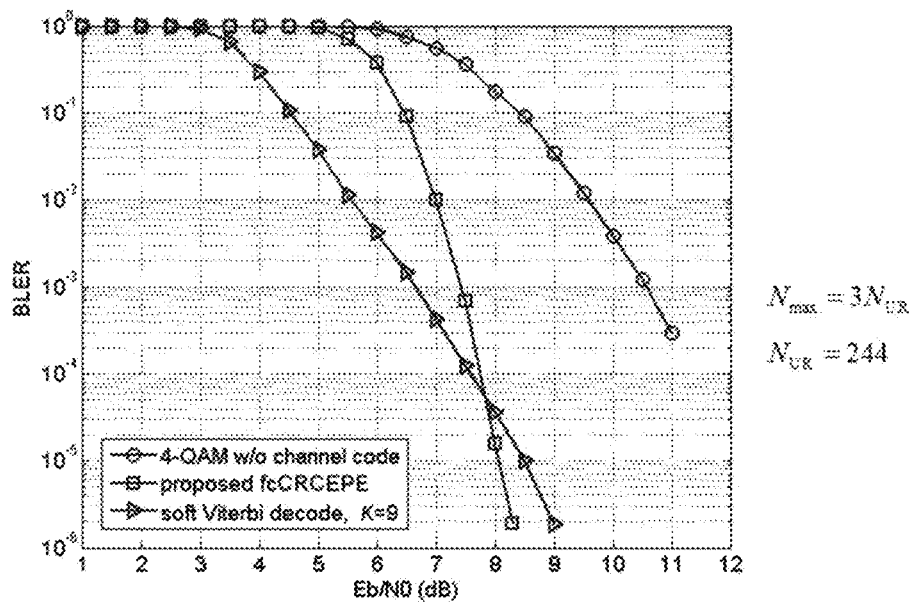

FIG. 28 is a graph illustrating error correction performance obtained from 4-QAM soft Viterbi decoding without a channel coding scheme, error correction performance obtained from a 16-QAM 1/2-rate convolutional encoding (K=9), and error correction performance (indicated by the line fcCRCEPE) obtained from the second embodiment of the present invention in which 4-QAM with CRC encoding and a 32-degree generator polynomial are employed. Similarly, it is recognized that complexity is remarkably reduced compared to the prior art while nearly the same error correction performance can be obtained.

According to the second embodiment of the present invention, since complexity is reduced compared to the prior art, it is possible to provide excellent error correction performance with a fast error correction speed. In addition, since a user is allowed to arbitrarily select the maximum toggling number $N_{b,max}$ or the maximum error correction pattern number $N_{max}$ as desired in a tradeoff relationship between speed and the performance, it is possible to provide an optimum customized error correction system depending on a corresponding communication environment.

Although exemplary embodiments of the present invention have been shown and described, it will be apparent to those having ordinary skill in the art that a number of changes, modifications, or alterations to the invention as described herein may be made, none of which depart from the spirit of the present invention, and all such changes, modifications, and alterations should therefore be seen as within the scope of the present invention.

The invention claimed is:

1. A method of determining an optimum toggle sequence in data transmission depending on a reliability of a soft decision bit stream generated by a soft decision bit stream generation circuit for a received signal, the method comprising processes of:

setting a fundamental toggle sequence (SEQ) group by a toggling circuit; and determining the optimum toggle sequence to increase an error detection and correction speed in the data transmission by the toggling circuit such that bits are toggled sequentially on a smaller sum basis of soft decision reliabilities to be toggled using the fundamental toggle sequence group, wherein toggling the bit sequentially on the smaller sum basis of the soft decision reliabilities includes toggling first a bit having a higher probability than another bit having a lower probability, wherein the fundamental toggle sequence (SEQ) group is determined based on the following equation:

$$SEQ[Nb \text{ max zeros}$$
$$0...000$$
$$0...001$$
$$0...010$$
$$0...011], \text{ and}$$

and
wherein the determining of the optimum toggle sequence includes toggling the bits in a manner such that a bit having a lower reliability than another is first toggled.

2. The method according to claim 1, wherein the process of determining the optimum toggle sequence includes a process of determining a sorting completion pointer (CRC_ptr) out of the fundamental toggle sequence group (SEQ) based on the following equation:

$$\text{CRC\_ptr} \leftarrow \text{find}(SEQ=2^{s-1}).$$

3. The method according to claim 2, further comprising a process of detecting and checking an error whenever toggling is performed sequentially until the toggle sequence indicated by the sorting completion pointer (CRC_ptr), wherein the received signal includes an error detection bit.

4. The method according to claim 2, further comprising a process of determining a next sequence by determining a next toggle sequence group ($SEQ^{temp}$) from the fundamental toggle sequence group (SEQ) based on the following equation:

$$SEQ^{temp} \leftarrow SEQ+2^{s-1}.$$

5. The method according to claim 4, wherein the process of determining the optimum toggle sequence includes a process of determining a sorting range indicator ($l_{pos}$) out of the next toggle sequence group ($SEQ^{temp}$) based on the following equation:

$$l_{pos} \leftarrow \text{find}\left(SEQ^{temp} = 2^{s-1} + \sum_{l=0}^{s-3} 2^l\right).$$

6. The method according to claim 5, wherein the process of determining the optimum toggle sequence includes a process of sorting unidentified sequences on a smaller sum-of-reliabilities basis by calculating a sum of the reliabilities for each sequence ranging from the sequence (CRC_ptr+1) next to that indicated by the sorting completion pointer to the sequence ($l_{pos}-1$) preceding the sorting range indicator.

7. The method according to claim 4, wherein the process of determining the next sequence includes a process of repeatedly determining the next sequence by determining the next toggle sequence group (SEQtemp') by combining the fundamental toggle sequence group (SEQ) and the next toggle sequence group (SEQtemp) into a next fundamental toggle sequence group (SEQ') and incrementing "s".

8. The method according to claim 7, wherein, in the process of determining the next sequence, the next toggle sequence group is determined by reflecting a sequence sorted through the process of sorting unidentified sequences.

9. The method according to claim 7, wherein the process of determining the next sequence includes a process of updating the sorting completion pointer (CRC_ptr) by adding "1" to "s".

10. The method according to claim 1, further comprising a process of detecting and checking an error whenever toggling is performed, wherein the received signal includes an error detection bit.

11. The method according to claim 10, wherein the error detection bit is a cyclic redundancy check (CRC) bit.

* * * * *